(12) United States Patent
Carlson

(10) Patent No.: US 6,381,059 B1
(45) Date of Patent: Apr. 30, 2002

(54) OPTICAL SHUTTER

(76) Inventor: Steven A. Carlson, 993 Memorial Dr., Apt 101, Cambridge, MA (US) 02138

( * ) Notice: Subject to any disclaimer, the term of this patent is extended or adjusted under 35 U.S.C. 154(b) by 0 days.

(21) Appl. No.: 09/706,166

(22) Filed: Nov. 3, 2000

Related U.S. Application Data

(60) Provisional application No. 60/163,349, filed on Nov. 3, 1999.

(51) Int. Cl.[7] .............................. G02F 1/03; H04J 14/00; H04J 14/02; G02B 5/22; F21V 9/00
(52) U.S. Cl. ..................... 359/244; 359/117; 359/124; 359/885; 252/582
(58) Field of Search ................................ 359/244, 117, 359/124, 290, 884, 885; 385/16; 252/582, 587

(56) References Cited

U.S. PATENT DOCUMENTS

| | | | |
|---|---|---|---|
| 3,251,881 A | 5/1966 | Susi et al. | 564/309 |
| 3,341,464 A | 9/1967 | Susi et al. | 252/587 |
| 3,400,156 A | 9/1968 | Milionis et al. | 564/8 |
| 4,656,121 A | 4/1987 | Sato et al. | 430/270.19 |
| 4,923,390 A | 5/1990 | Oguchi et al. | 430/270.19 |
| 5,091,984 A | 2/1992 | Kobayashi et al. | 385/16 |
| 5,156,938 A | 10/1992 | Foley et al. | 430/200 |
| 5,171,650 A | 12/1992 | Ellis et al. | 430/20 |
| 5,256,506 A | 10/1993 | Ellis et al. | 430/20 |
| 5,399,459 A | 3/1995 | Simpson et al. | 430/270.1 |
| 5,406,407 A | 4/1995 | Wolff | 359/326 |
| 5,501,938 A | 3/1996 | Ellis et al. | 430/201 |
| 5,539,100 A | 7/1996 | Wasielewski et al. | 540/145 |
| 5,605,732 A | 2/1997 | Mihara et al. | 428/64.8 |
| 5,732,168 A | 3/1998 | Donald | 385/16 |
| 5,740,287 A | 4/1998 | Scalora et al. | 385/6 |
| 5,757,525 A | 5/1998 | Rao et al. | 359/108 |
| 5,828,799 A | 10/1998 | Donald | 385/16 |
| 5,841,912 A | 11/1998 | Mueller-Fiedler et al. | 385/7 |

(List continued on next page.)

FOREIGN PATENT DOCUMENTS

| | | |
|---|---|---|
| GB | 0 675 003 A1 | 3/1995 |
| WO | WO 98/54615 | 12/1998 |

OTHER PUBLICATIONS

Nagamura, et al. "Molecular Orientation of Photogenerated Radicals in Novel Photoelectrochromic Langmuir–Blodgett Films", pp. 617 to 619, Thin Solid Films, vol. 210/211, No. 1/2, Part 2, Apr. 30, 1992.

Patent Abstracts of Japan, vol. 005, No. 114 (C–064), Jul. 23, 1981 & JP 56 053177 A (Hitachi Ltd.), May 12, 1981, Abstract, Yasusada (inventor), "Photochromic Material".

Patent Abstracts of Japan, vol. 1997, No. 12, Dec. 25, 1997 & JP 09 211397 A (Toray Ind. Inc.),Aug. 15, 1997 Abstract, Masao (inventor), "Display Device".

Primary Examiner—Georgia Epps
Assistant Examiner—Michael A. Lucas
(74) Attorney, Agent, or Firm—Sampson & Associates

(57) ABSTRACT

The present invention pertains to an optical shutter comprising an organic free compound, preferably a radical cation or a radical anion, wherein the organic free radical compound forms a reaction product having a change in absorption in a near-infrared or a wavelength region as a result of a photo-induced reaction of the free radical compound. Preferably, the photo-induced reaction occurs in less than 0.1 nanoseconds after absorption of photons by the free radical compound. Also, preferably, the change in absorption is reversible, and the optical shutter is reversibly imaged in less than 10 milliseconds to regenerate the free radical compound. Provided is an optical shutter for use as an optical switch in fiber optic communications, and, alternatively, for use in a laser protection device, a security protection system, and an eyewear device. Also provided are optical switch arrays, optical buffers, optical routers, and tunable optical gain filters comprising such optical shutters.

89 Claims, 5 Drawing Sheets

U.S. PATENT DOCUMENTS

| | | | |
|---|---|---|---|
| 5,872,648 A | 2/1999 | Sanchez et al. | 359/290 |
| 5,905,587 A | 5/1999 | Maeno et al. | 359/117 |
| 5,923,798 A | 7/1999 | Aksyuk et al. | 385/19 |
| 5,943,453 A | 8/1999 | Hodgson | 385/16 |
| 5,948,600 A | 9/1999 | Roschger et al. | 430/348 |
| 5,959,749 A | 9/1999 | Danagher et al. | 359/124 |
| 5,960,133 A | 9/1999 | Tomlinson | 385/18 |
| 5,970,185 A | 10/1999 | Baker et al. | 385/3 |
| 6,165,389 A * | 6/2000 | Asher et al. | 252/582 |
| 6,084,702 A | 7/2000 | Byker et al. | 584/100 |
| 6,171,766 B1 | 1/2001 | Patel et al. | 430/339 |
| 6,172,795 B1 | 1/2001 | Carlson | 359/290 |

* cited by examiner

OPTICAL SHUTTER

RELATED APPLICATIONS

This application claims priority to U.S. Provisional Patent Application No. 60/163,349, filed Nov. 3, 1999, the disclosure of which is fully incorporated herein in its entirety for all purposes.

FIELD OF THE INVENTION

The present invention relates to the field of optical shutters and, particularly, pertains to optical shutters which operate in the near-infrared and/or visible wavelength regions. More specifically, this invention pertains to optical shutters comprising an organic free radical compound, wherein the organic free radical compound forms a reaction product having a change in absorption in a wavelength region as a result of a photo-induced reaction of the free radical compound. The optical shutters may be reversibly imaged to regenerate the free radical compound. This invention also pertains to optical switch arrays, optical buffers, optical routers, and tunable optical gain filters comprising the optical shutters of this invention.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optics systems rapidly increases due to the growing demand from Internet usage and other communications, all-optical switching systems are of increased interest to overcome the high cost and slow switching speeds of conventional switches. These conventional switches include, for example, various mechanical switches, electro-optic switches, and thermo-optic switches, such as, for example, described in U.S. Pat. Nos. 5,732,168 and 5,828,799, both to Donald. In particular, the increased complexity and cost of switching systems which involve switching from an optical signal to an electrical signal and then back to an optical signal have increased the level of interest in all-optical switches.

An all-optical switch typically switches an optical signal from one output port to another. This is typically accomplished by applying an input pump signal from a pump laser source to cause the optical signal to be selectively switched. The switch is responsive to the laser pump signal to selectively switch the light of the optical signal to one or the other of the output ports.

A variety of approaches are known for making all-optical or hybrid optical switches, such as, for example, described in U.S. Pat. Nos. 5,905,587 to Maeno et al.; 5,923,798 to Aksyuk et al.; 5,970,185 to Baker et al.; 5,841,912 to Mueller-Fiedler et al.; 5,757,525 to Rao et al.; 5,872,648 to Sanchez et al.; 5,091,984 to Kobayashi et al.; 5,406,407 to Wolff; 5,740,287 to Scalora et al.; 5,960,133 to Tomlinson; and 5,539,100 to Waslielewski et al. For example, as described in U.S. Pat. No. 5,943,453 to Hodgson, one basic configuration for an all-optical switch is a Mach-Zehnder interferometer which includes a first fiber optic input arm for receiving an input optical signal and a second fiber optic input arm for receiving a switching pump signal. The input arms are fused together to form a first coupler which subsequently branches out into two intermediate arms. The first coupler splits the input light signal into equal portions which then enter the two intermediate arms. The two intermediate arms are once again fused to form a second coupler which branches into two output arms. After traveling through the two intermediate arms, the two signals are recombined by the second coupler. If the two signals are in phase at the second coupler, then all the light is coupled into a first one of the two output ports. If the two signals are completely out of phase, then the light is coupled into the other of the two output ports. The reliability of the Mach-Zehnder interferometer for optical switching is typically sensitive to temperature-dependent effects.

The need for improved optical switches is increased by the use of wavelength add/drop multiplexing (WADM) which converts the optical signal in the optical fiber into, for example, 16 signals at 16 different wavelengths in a near-infrared range of about 1540 to 1560 nm, as, for example, described in Bell Labs Technical Journal, January-March 1999, pages 207 to 229, and references therein, by Giles et al.; and in U.S. Pat. No. 5,959,749 to Danagher et al. There is about 1 nm between the wavelength channels. The primary function of the optical switch is to add and/or drop optical signals from the multiple wavelengths traveling through the optical fiber. It would be highly desirable to have arrays of optical switches to handle the optical signals from multiple wavelengths per optical fiber and from multiple optical fibers, such as up to 100×100 or greater optical switch arrays. Also, it would be highly desirable if the response time for the optical switch is ultrafast, such as 1 nanosecond or less.

It would be advantageous if an all-optical switching system were available which avoided the complexity and cost of hybrid electro-optic and other systems while increasing the speed of the switching times from the millisecond range to the nanosecond or picosecond ranges.

SUMMARY OF THE INVENTION

An organic free radical compound where the excited state is an excited state from the free radical ground state may have a rapid internal conversion from this excited state back to the ground state with a concomitant production of heat in a time scale of as low as 1 picosecond or less. In one example of this, an organic radical cation compound absorbs photons in the presence of a thermochromic compound, converts the absorbed photons to heat in less than 1 nanosecond, and causes a change in absorption due to heat-induced changes in the thermochromic compound, as described in PCT International Publication No. WO 98/54615, titled "Optical Shutter Device" and published December 3, 1998, to Carlson. The present invention utilizes an organic free radical compound which undergoes a photo-induced electron transfer reaction which causes changes in absorption due to the oxidation or the reduction of the free radical compound. This photo-induced electron transfer reaction may occur faster and with higher efficiency than internal conversion of the absorbed photons to heat or, alternatively, may have a similar or slightly lower speed and efficiency than this internal conversion to heat so that both electron transfer and heat formation processes occur.

One aspect of the present invention pertains to an optical shutter comprising an organic free radical compound in which the free radical compound is characterized by forming an oxidized or reduced product having a change in absorption in a near-infrared wavelength region as a result of a photo-induced electron transfer reaction of the free radical compound. In one embodiment, the free radical compound is a radical cation, preferably an aminium radical cation, and most preferably, the radical cation is tris (p-dibutylaminophenyl) aminium hexafluoroantimonate. In one embodiment, the free radical compound is a radical anion, preferably an anthrasemiquinone radical anion.

In one embodiment of the optical shutter of this invention, the free radical compound is a radical cation, and the optical shutter further comprises a radical anion. In one embodiment, the free radical compound is a radical anion, and the optical shutter further comprises a radical cation. In one embodiment, the free radical compound comprises one or more radical cations and one or more radical anions, and the change in absorption results from a photo-induced electron transfer reaction of at least one of the one or more radical cations and of at least one of the one or more radical anions. In one embodiment, the free radical compound comprises a salt of a radical cation and a radical anion.

In one embodiment of the optical shutter of the present invention, the change in absorption is greater than 0.1, preferably greater than 0.5, and more preferably greater than 1.5. In one embodiment, the near-infrared wavelength region of the change in absorption is from 700 to 1000 nm. In one embodiment, the near-infrared wavelength region of the change in absorption is from 1000 to 1400 nm, preferably from 1400 to 1600 nm, more preferably from 1520 to 1580 nm, and most preferably from 1500 nm to 1700 nm.

In one embodiment of the optical shutter of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds or less than 1 picosecond after absorption of photons by the free radical compound.

In one embodiment of the optical shutter of the present invention, the photo-induced electron transfer reaction is an oxidation of the free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound.

In a preferred embodiment of the optical shutter of this invention, the change in absorption is reversible. In one embodiment, the reversible change in absorption is induced by heat. In one embodiment, the reversible change in absorption is induced by radiation selected from the group consisting of: ultraviolet radiation, visible radiation, and infrared radiation; and, preferably, the reversible change in absorption is further induced by the presence of oxygen. In one embodiment, the reversible change in absorption occurs at less than 50 ° C. in the absence of radiation. In one embodiment, the reversible change in absorption occurs in less than 1 second, preferably occurs in less than 10 milliseconds, more preferably occurs in less than 1 millisecond, and most preferably occurs in less than 0.1 milliseconds.

In one embodiment of the optical shutter of the present invention, the photo-induced electron transfer reaction is induced by ultraviolet radiation. In one embodiment, the photo-induced electron transfer reaction is induced by visible radiation, and preferably is induced by near-infrared radiation. In one embodiment, the photo-induced electron transfer reaction is induced by absorption of photons by a free radical ground state of the free radical compound.

In one embodiment of the optical shutter of this invention, the optical shutter further comprises a metallized layer on at least one side of a layer comprising the free radical compound of the optical shutter. In one embodiment, the metallized layer comprises aluminum.

One aspect of the present invention pertains to an optical shutter comprising an organic radical cation compound in which the radical cation compound is characterized by forming an oxidized or a reduced product having a change in absorption in a near-infrared wavelength region as a result of a photo-induced electron transfer reaction of the radical cation compound. In one embodiment, the optical shutter further comprises a radical anion.

Another aspect of this invention pertains to an optical shutter comprising an organic radical anion compound in which the radical anion compound is characterized by forming an oxidized or a reduced product having a change in absorption in a near-infrared wavelength region as a result of a photo-induced electron transfer reaction of the radical anion compound. In one embodiment, the optical shutter further comprises a radical cation.

Still another aspect of the present invention pertains to an optical shutter comprising one or more radical cations and one or more radical anions, wherein at least one of the radical cations and at least one of the radical anions is characterized by forming an oxidized or a reduced product having a change in absorption in a near-infrared wavelength region as a result of a photo-induced electron transfer reaction of at least one of the one or more radical cations and at least one of the one or more radical anions.

Another aspect of the present invention pertains to an optical shutter comprising an organic free radical compound, preferably a radical cation compound or a radical anion compound, in which the free radical compound is characterized by forming an oxidized or a reduced product having a change in absorption in a visible and/or a near-infrared region as a result of a photo-induced electron transfer reaction of the free radical compound, wherein the change in absorption is reversible. In one embodiment, the optical shutter is utilized in an optical switch for a fiber optics communications channel.

Yet another aspect of this invention pertains to an optical shutter comprising an organic free radical compound in which the free radical compound is characterized by forming an oxidized or a reduced product having a change in absorption in a visible wavelength region as a result of a photo-induced electron transfer reaction of the free radical compound. In one embodiment, the change in absorption is reversible. In one embodiment, the change in absorption is reversible, and the optical shutter is utilized in a viewing lens of an eyewear device.

Another aspect of the present invention pertains to an optical shutter comprising an organic free radical compound in which the free radical compound is characterized by forming an oxidized or a reduced product having a change in absorption in a visible or a near-infrared wavelength region as a result of a photo-induced electron transfer reaction of the free radical compound. In one embodiment, the optical shutter is utilized in a laser protection device for protection of eyes or sensors from a source of laser radiation. In one embodiment, the optical shutter is utilized in a security protection system based on detecting the change in absorption upon exposure of the optical shutter in the security protection system to high intensity radiation selected from the group consisting of: ultraviolet radiation, visible radiation, and infrared radiation.

Still another aspect of this invention pertains to an optical shutter imageable by photons and having a first state of a low absorption at a wavelength and a second state of a high absorption at the wavelength, which shutter comprises a photon-absorbing layer, wherein the photon-absorbing layer comprises an organic free radical compound, as described herein, and the photon-absorbing layer is characterized by absorption of the photons by the free radical compound to form a reaction product having a change in absorption at the wavelength and by a reverse reaction of the reaction product to regenerate the free radical compound; and wherein the shutter is characterized by being reversibly imageable between the first and second states. The unique properties of the optical shutter of the present invention may be utilized to prepare a wide variety of extremely compact, picosecond speed optical devices including, but not limited to, optical switch arrays, optical buffers, optical routers, and tunable optical gain filters comprising one or more of the optical shutters.

As will be appreciated by one of skill in the art, features of one aspect or embodiment of the invention are also applicable to other aspects or embodiments of the invention.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

DETAILED DESCRIPTION OF THE INVENTION

Figure 1:
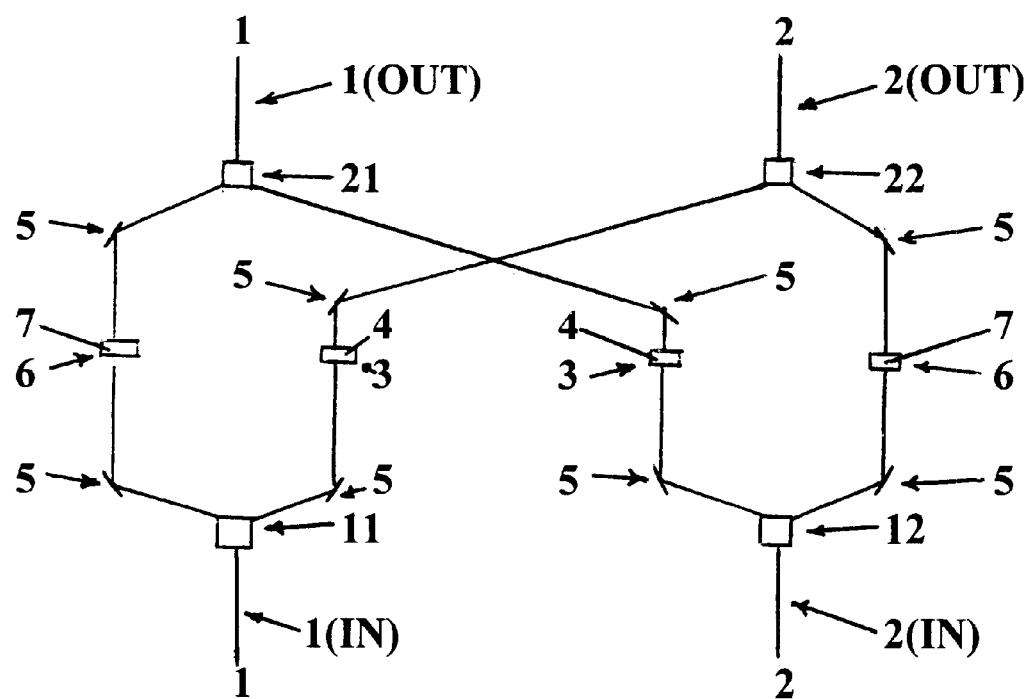
FIG. 1 illustrates one embodiment of an optical switch array utilizing the optical shutters of the present invention.

The optical shutters of the present invention provide superior speed of response, such as a response time of 1000 picoseconds or less, to the incident radiation, and are particularly useful in systems where an all-optical shutter mechanism is desirable.

Organic Free Radical Compounds

The term "organic free radical compounds," as used herein, pertains to organic compounds which comprise at least one free unpaired electron on a neutral atom, such as, for example, a carbon atom, a nitrogen atom, or an oxygen atom, in the ground state of the organic compound. Suitable organic free radical compounds for the optical shutters of the present invention include neutral organic free radicals, organic free radical cations, and organic free radical anions. For purposes of brevity, the terms "organic free radical cation", "organic radical cation", and "radical cation" are used interchangeably herein. The word "cation," as used herein, pertains to a positively charged atom in a molecule, such as, for example, a positively charged nitrogen atom. Similarly, the terms "organic free radical anion", "organic radical anion", and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable organic free radical cations for the optical shutters of this invention include, but are not limited to, aminium radical cations, such as, for example, tris (p-dibutylaminophenyl) aminium hexafluoroantimonate, which is commercially available as IR-165, a trademark for a dye available from Glendale Technologies, Inc., Lakeland, Fla. IR-165 is known to be a stable material that may exist in a layer of material, such as in a polymeric coating, under normal room conditions for an extended period of time. Other suitable aminium radical cations with a tris (p-dibutylaminophenyl) aminium salt molecular structure include IR-126 and IR-99, which are trademarks for dyes available from Glendale Technologies, Inc., Lakeland, Fla. These two dyes are likewise known to be stable in the dry powder form and in a layer of material, such as in a polymer-containing coating, under ambient room conditions for extended periods of time, such as many years.

Examples of suitable organic free radical anions for the optical shutters of the present invention include, but are not limited to, anthrasemiquinone radical anions, such as, for example, described in *Photochemistry and Photobiology*, Vol. 17, pages 123–131 (1973) by Carlson and Hercules.

Due to the presence of the free radical moiety, organic free radical compounds have unique longer wavelength absorptions and unique photothermal and photochemical transformations, particularly when compared to the corresponding non-free radical compounds. For example, the absorption spectra of IR-165, a radical cation, and its extremely rapid internal conversion of absorbed photons to heat is described in various publications, such as in PCT International Publication No. WO 98/54615, and references therein, to Carlson. Also, for example, the absorption spectra of 9,10-anthrasemiquinone radical anion and its photochemistry are described in the above-referenced publication by Carlson and Hercules and in *The Photochemistry of Anthraquinone and Related Compounds*, Ph.D. Thesis, Massachusetts Institute of Technology, 1969, by Carlson.

An organic free radical compound where the excited state is an excited state from the free radical ground state may have a rapid internal conversion from this excited state back to the ground state with an accompanying production of heat by this photothermal process in a time scale of as low as 1 picosecond or less, as, for example, observed with coatings of IR-165 upon high intensity laser irradiation at 1065 nm where the absorption is from a free radical ground state. The sub-picosecond speed of this photon-to-heat conversion is described, for example, in PCT International Publication No. WO 98/54615, and references therein, to Carlson. The present invention is directed at utilizing organic free radical compounds that undergo a photo-induced electron transfer reaction that competes with and, preferably, exceeds the speed of these photothermal processes for use in an optical shutter where the desired change in absorption upon optical excitation is a result of the formation of an oxidized or a reduced product of the organic free radical compound due to the photo-induced electron transfer reaction.

For example, under oxidative or reductive conditions, a light yellow-green layer comprising IR-165 upon laser exposure at 1065 nm may undergo photo-induced electron transfer reactions which compete efficiently with the ultrafast photothermal processes of IR-165 to produce an oxidized product having a change in absorption in both the visible and the near-infrared wavelength regions or, alternatively, to produce a reduced product having a change in absorption in both the visible and the near-infrared wavelength regions. For example, the oxidized product of IR-165 may be a blue compound from a two-electron photo-induced electron transfer reaction, particularly when the layer of IR-165 comprises a polymer, such as nitrocellulose, which promotes oxidation of IR-165 upon exposure to radiation. Similarly, for example, the reduced product of IR-165 may be an intense green compound from an one-electron photo-induced electron transfer reaction, particularly when the layer of IR-165 comprises a polymer which does not promote oxidation of IR-165 upon exposure to radiation. The green, reduced product of IR-165 has new intense absorption peaks at 950 nm and 1480 nm, in comparison to the absorption of IR-165. One of the green, reduced products of IR-165 is IR-126, which is an one-electron reduction product of IR-165. Depending on the other materials present in the layer, these blue oxidized or green reduced compounds may be transient compounds and may revert to the starting IR-165 material at various speeds from less than 0.1 milliseconds to many seconds. A photo-induced reaction may be utilized to accelerate the reversion back to the starting IR-165 material.

Also, for example, layers comprising anthrasemiquinone radical anions, including the many possible substituted and other derivatives of the anthrasemiquinone radical anion, may undergo photo-induced electron transfer reactions which occur very rapidly and compete efficiently with the photothermal processes of these radical anions, to produce a reduced product having a change in absorption in both the visible and the near-infrared wavelength regions. This change in absorption typically includes a loss in absorption in the near-infrared wavelength region due to the conversion of the radical anion to a non-free radical compound, such as, for example, a dianion.

Optical Shutters

One aspect of the present invention pertains to an optical shutter comprising an organic free radical compound in which the free radical compound is characterized by forming an oxidized or a reduced product having a change in absorption in a visible and/or a near-infrared wavelength region as a result of a photo-induced electron transfer reaction of the free radical compound. The term "near-infrared wavelength region," as used herein, pertains to wavelengths from 700 nm to 2000 nm. The term "visible wavelength region," as used herein, pertains to wavelengths from 400 to 700 nm. In one embodiment, the free radical compound is a radical cation, preferably an aminium radical cation, and most preferably, the radical cation is tris (p-dibutylaminophenyl) aminium hexafluoroantimonate (TAH). In one embodiment, the free radical compound is a radical anion, preferably an anthrasemiquinone (ASQ) radical anion.

In one embodiment of the optical shutter of this invention, the free radical compound is a radical cation, and the optical shutter further comprises a radical anion. The absorption change occurs as a result of the radical cation forming an oxidized or a reduced product, but the radical anion increases the efficiency of the photo-induced electron transfer reaction.

In one embodiment, the free radical compound is a radical anion, and the optical shutter further comprises a radical cation. The absorption change occurs as a result of the radical anion forming an oxidized or a reduced product, but the radical cation increases the efficiency of the photo-induced electron transfer reaction.

In one embodiment, the free radical compound comprises one or more radical cations and one or more radical anions, and the change in absorption results from a photo-induced electron transfer reaction of at least one of the one or more radical cations and of at least one of the one or more radical anions. The photo-induced electron transfer reaction may involve a joint photo-oxidation-photo reduction of a radical cation and a radical anion, including, for example, photosensitization of the electron transfer reaction of the radical cation, such as IR-165, by the radical anion, such as ASQ radical anion, or, alternatively, photosensitization of the electron transfer reaction of the radical anion by the radical cation.

In one embodiment, the free radical compound comprises a salt of a radical cation and a radical anion. This association of the radical cation molecules and the radical anion molecules in close proximity to each other, such as, for example, using the ASQ radical anion as the anion for some or all of the IR-165 radical cation, may enhance the speed and efficiency of the photo-induced electron transfer reaction and also of the reverse electron transfer reaction to reform the original free radical compounds.

In one embodiment of the optical shutter of the present invention, the change in absorption is greater than 0.1, preferably greater than 0.5, and more preferably greater than 1.5. These absorption changes are measured in optical density units, as known in the art, where an optical density of 1.0 corresponds to 90% absorption and 10% transmission of the incident wavelength or wavelengths of radiation. Thus, for example, an initial absorption or optical density of the optical shutter of 0.1 at 1546 nm that changes to an absorption or optical density in the optical shutter of 1.6 at 1546 nm would have a change in absorption of 1.6 minus 0.1 or 1.5. In one embodiment, the near-infrared wavelength region of the change in absorption is from 700 to 1000 nm. In one embodiment, the near-infrared wavelength region of the change in absorption is from 1000 to 1400 nm, preferably from 1400 to 1600 nm, more preferably from 1520 to 1580 nm, and most preferably from 1500 to 1700 nm.

In one embodiment of the optical shutter of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds.

In one embodiment of the optical shutter of the present invention, the photo-induced electron transfer reaction is an oxidation of the free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound. The oxidation product of a radical cation may be a diradical which may readily undergo reverse electron transfer to regenerate the radical cation. Also, the reduction product of a radical anion may be a dianion which may readily undergo reverse electron transfer to regenerate the radical anion and, in the case of ASQ radical anion and the corresponding dianion, this could involve the controlled presence of oxygen during the reverse electron transfer process.

In a preferred embodiment of the optical shutter of this invention, the change in absorption is reversible. In one embodiment, the reversible change in absorption is induced by heat. In one embodiment, the reversible change in absorption is induced by radiation selected from the group consisting of: ultraviolet radiation, visible radiation, and infrared radiation; and, preferably, the reversible change in absorption is further induced by the presence of oxygen. For example, the ASQ radical anion and the corresponding dianion are both unstable in the presence of oxygen and, in the presence of oxygen, may be oxidized to the corresponding anthraquinone compound, which anthraquinone compound may subsequently be photoreduced or otherwise reduced by known methods to form the corresponding ASQ radical anion. In one embodiment, the reversible change in absorption occurs at less than 50° C. in the absence of radiation. In one embodiment, the reversible change in absorption occurs in less than 1 second, preferably occurs in less than 10 milliseconds, more preferably occurs in less than 1 millisecond, and most preferably occurs in less than 0.1 milliseconds.

In one embodiment of the optical shutter of the present invention, the photo-induced electron transfer reaction is induced by ultraviolet radiation. In one embodiment, the photo-induced electron transfer is induced by visible radiation, and preferably is induced by near-infrared radiation. In one embodiment, the photo-induced electron transfer reaction is induced by absorption of photons by a free radical ground state of the free radical compound. This is particularly important where the excited states of the free radical moiety ground state of the free radical compound can not be efficiently populated by absorption by a non-free radical ground state, such as, for example, by an aromatic moiety ground state, and by its subsequent internal conversion to a lower excited state related to the free radical moiety ground state.

In one embodiment of the optical shutter of this invention, the optical shutter further comprises a metallized layer on at least one side of a layer comprising the free radical compound of the optical shutter. In one embodiment, the metallized layer comprises aluminum. This metallized layer may serve a variety of functions, such as, for example, reflecting more incident radiation back through the optical shutter layer, enhancing heat development in the optical shutter layer, and acting as an enhanced or a reduced reflective element in an optical switch comprising the optical shutter of this invention.

One aspect of the present invention pertains to an optical shutter comprising an organic radical cation compound in which the radical cation compound is characterized by forming an oxidized or a reduced product having a change in absorption in a visible and/or near-infrared wavelength region as a result of a photo-induced electron transfer reaction of the radical cation compound. In one embodiment, the optical shutter further comprises a radical anion.

Another aspect of this invention pertains to an optical shutter comprising an organic radical anion compound in which the radical anion compound is characterized by forming an oxidized or a reduced product having a change in absorption in a visible and/or near-infrared region as a result of a photo-induced electron transfer reaction of the radical anion compound. In one embodiment, the optical shutter further comprises a radical cation.

Still another aspect of the present invention pertains to an optical shutter comprising one or more radical cations and one or more radical anions, wherein at least one of the radical cations and at least one of the radical anions is characterized by forming an oxidized or a reduced product having a change in absorption in a visible and/or near-infrared wavelength region as a result of a photo-induced electron transfer reaction of at least one of the one or more radical cations and at least one of the one or more radical anions.

Another aspect of the present invention pertains to an optical shutter comprising an organic free radical compound, preferably a radical cation compound or a radical anion compound, in which the free radical compound is characterized by forming an oxidized or a reduced product having a change in absorption in a visible and/or near-infrared region as a result of a photo-induced electron transfer reaction of the free radical compound, wherein the change in absorption is reversible. In one embodiment, the optical shutter is utilized in an optical switch for a fiber optics communications channel. For example, an initial optical density of less than 0.1 or greater than 80% transmission in the 1525 to 1575 nm region of interest for the optical switch may be switched to an optical density of greater than 1.6 or less than 2.5% transmission in less than 1 nanosecond and then reversibly switched back to the initial optical density in less than 1 second.

Still another aspect of this invention pertains to an optical shutter imageable by photons and having a first state of a low absorption at a wavelength and a second state of a high absorption at the wavelength, which shutter comprises a photon-absorbing layer, wherein the photon-absorbing layer comprises an organic free radical compound, as described herein, and the photon-absorbing layer is characterized by absorption of the photons by the free radical compound to form a reaction product having a change in absorption at the wavelength and by a reverse reaction of the reaction product to regenerate the free radical compound; and wherein the shutter is characterized by being reversibly imageable between the first and second states.

A wide variety of organic free radical compounds, such as various neutral free radicals, radical cations, and radical anions, may be utilized in the optical shutters of the present invention. Particular advantages for the use of organic free radical compounds in the optical shutters of this invention include, but are not limited to, their extremely intense infrared absorptions at the desired wavelengths for photon excitation and/or the absorption changes associated with optical shutters, their unique ultra-high speed photon conversions at as fast as sub-picosecond times, their stability to degradation by heat, light, or ambient conditions of moisture and air, their ease of fabrication by, for example, coating or plastic molding, and their non-toxicity.

Their extremely intense absorptions are particularly beneficial in reducing the amount of material that is needed to produce the desired reversible absorption change in the optical shutter and thereby allow the optical shutter to be made on a very miniature scale, such as less than 8 microns for the thickness of the layer of the optical shutter which absorbs the photons and causes the absorption change. This layer may be made much thicker than 8 microns if desired in the fabrication of the optical shutter for use in optical switch arrays and other optical components, but the amount of the organic free radical compound used may be kept small since the thicker layers do not need to contain any additional organic free radical compound to maintain the desired level of absorption changes. In one embodiment, the thickness of the photon-absorbing layer is 2 to 100 microns. In one embodiment, the thickness of the photon-absorbing layer is 4 to 25 microns. In one embodiment, the thickness of the photon-absorbing layer is less than 8 microns.

For example, IR-165 and IR-126 are illustrative of one type of the organic free radical compounds for the optical shutters of this invention and may be reversibly formed in a photon-induced one electron transfer reaction, where IR-126 is the one-electron reduction product of IR-165 and, conversely, IR-165 is the one-electron oxidation product of IR-126. IR-165 has an extremely high molar extinction coefficient of about 80,000 liters/mole-cm at 1065 nm where photon excitation may be done and has low molar extinction coefficients of less than about 5,000 liters/mole-cm in the 1530 to 1620 nm range where optical shutters may be utilized in optical switch arrays and other optical components in a fiber optics communications channel. IR-126 has a very high molar extinction coefficient of about 40,000 liters/mole-cm in a broad and fairly flat absorption across the 1530 to 1620 nm wavelength range. Assuming that IR-126 is present at about a 25% loading by weight in the photon-absorbing layer of the optical shutter and needs to have an optical density of greater than 3.1 in order to provide greater than 99.9% absorption at the wavelengths in the 1530 to 1620 nm range to obtain the contrast ratio of greater than 30 dB that is desired in an optical shutter in a fiber optics communications channel, the photon-absorbing layer containing IR-126 only needs to be about 4 microns thick. Also, for example, less than 1 microgram of IR-126 would be needed to make 16,000 optical shutters, such as might be utilized in a 1200×1200 optical switch array. Also, for example, due to the extremely small size of the optical shutters, a 1200×1200 optical switch array could have a volumetric size as small as 0.001 cm$^3$ or even smaller, although a larger size might be selected for ease of fabrication and integration with the source of photons and with other optical components.

While not wishing to be bound by any particular theory, the unique ultra-high speed photon conversions of the organic free radical compounds, such as at sub-picosecond speeds, are thought to be greatly influenced by the unique free radical character of their ground states and perhaps of their excited states. Picosecond and sub-picosecond speeds are particularly useful for optical shutters where, for example, nanosecond optical switching of optical data packets is desired, as known in the art of fiber optics communications channels, and, also for example, where protection of eyes or sensors from radiation is desired in a picosecond or faster speed.

The optical shutter of the present invention may be illustrated in one embodiment by an optical shutter comprising a photon-absorbing layer, wherein the photon-absorbing layer comprises IR-165, an organic radical cation. The thickness of the photon-absorbing layer is 4 microns, and the IR-165 is present at 25 weight per cent of the photon-absorbing layer. This optical shutter is imageable by photons, such that, for example, when IR-165 in the photon-absorbing layer absorbs photons of 1065 nm wavelength and the photon-absorbing layer comprises a reductive, electron-donating matrix of polymers, counteranions, and other additives around the aminium radical cation, IR-165 forms a reaction product, such as an one-electron reduction product which is the same as or similar to IR-126 depending on the counteranion. Prior to the absorption of photons, the optical shutter has a state of low absorption, such as an optical density of less than 0.05 due to IR-165, at a wavelength, such as 1620 nm. After the absorption of photons and the formation of the reaction product, the optical shutter has a state of high absorption, such as an optical density of 3.1 due to IR-126 or a similar organic free radical compound, at the wavelength, such as 1620 nm. Subsequently, by a dark reaction at ambient or room temperatures or at temperatures less than 50° C. in the absence of radiation, the reaction product, such as IR-126 or a similar organic free radical compound, undergoes a reverse reaction to regenerate the starting free radical compound, IR-165, and to return the optical shutter to the state of low absorption at the wavelength, such as 1620 nm.

Alternatively, the reverse reaction may be induced by heat, either by heat produced during the imaging process that raises the temperature of the photon-absorbing layer above 50° C. or by the external application of heat from a heat source, such as maintaining the optical shutter in a hot environment at a temperature greater than 50° C. The aminium radical cations are typically stable at temperatures up to 250° C. and are known to be stable under non-thermal equilibrium conditions, such as those experienced in laser ablation imaging, at temperatures up to 600° C.

Also, alternatively, the reverse reaction may be induced by radiation selected from the group consisting of ultraviolet radiation, visible radiation, and infrared radiation. Where the reaction product or other components present in the photon-absorbing layer have oxygen-sensitive reactivities, the presence of a desired level of oxygen in combination with the radiation may be utilized to induce the reverse reaction. In one embodiment, the wavelength of the radiation inducing the reverse reaction is different from the wavelength of the photons absorbed to form the reaction product. Thus, although the mechanism of the reverse reaction may be varied, the optical shutter of this invention is characterized by being reversibly imageable between the first and second states of absorption at the wavelength.

The speed and/or timing of the reverse reaction may be varied over a wide range depending on the requirements of the product application. In one embodiment, the reverse reaction occurs in 1 second to 1 year after the photo-induced formation of the reaction product. In one embodiment, the reverse reaction occurs in less than 1 second. In one embodiment, the reverse reaction occurs in less than 10 milliseconds. In one embodiment, the reverse reaction occurs in less than 1 millisecond. In one embodiment, the reverse reaction occurs in less than 0.1 milliseconds. In one embodiment, the reverse reaction occurs in less than 0.01 nanoseconds or 10 picoseconds, such as in 2 to 3 picoseconds or less. When radiation is used to induce the reverse reaction, the timing of the reverse reaction may be selected depending on the timing of the exposure of the optical shutter to the radiation.

Also, with radiation to induce the reverse reaction, the speed may be as fast as the speeds of forming the reaction product after the absorption of the photons, such as, for example, sub-picosecond speeds. For example, when a reversible photon-induced electron transfer occurs in the optical shutter, the speed of the formation of the reaction product may be sub-picosecond and as low as 40 femtoseconds or less and the speed of a dark or heat-induced reverse reaction of the reaction product to regenerate the starting organic free radical may be as fast as 2 to 3 picoseconds. These fast speeds are particularly advantageous for optical shutters for use in nanosecond optical packet switching, as known in the art of fiber optics communications channels.

The wavelengths of the photons absorbed by the photon-absorbing layer to form the reaction product may be selected from a wide variety of wavelengths depending on the absorption spectra of the organic free radical compound and the photon-absorbing layer, the wavelengths available from the source of photons, and any need to avoid using a wavelength that may interfere with the wavelength at which the optical shutter has its states of low and high absorptions and is designed to operate as an "on-off" switch. In one embodiment, the wavelength of the photons is one or more ultraviolet wavelengths. In one embodiment, the wavelength of the photons is one or more wavelengths from 400 to 700 nm. In one embodiment, the wavelength of the photons is one or more wavelengths from 700 to 2000 nm. In a preferred embodiment, the absorption of the photons by the free radical compound is from a free radical ground state of the free radical compound, and more preferably, the wavelength of the photons absorbed by the free radical ground state is one or more wavelengths from 700 to 2000 nm.

A wide variety of sources of the photons to form the reaction product and, when radiation is used to induce the reverse reaction, to regenerate the starting free radical compound, may be utilized. Suitable sources of photons include, but are not limited to, lasers, continuous light sources such as mercury lamps, pulsed light sources such as xenon pulse lamps, and electroluminescent light-emitting devices, as known in the art of high intensity sources of photons. It is preferred to provide the photons in pulses such that suitable light sources include pulsed lasers and other pulsed light sources.

Alternatively, in one embodiment, with lasers and continuous light sources, a first imodulator is interposed between the laser or the continuous light source to provide a desired length of imaging time and a desired imagewise area for the imaging of the optical shutter by the photons. Suitable modulators may be any of the variety of light modulators, such as electro-optic modulators, known in the art of light modulators, depending on the requirements for the "on-off" imaging, such as, for example, 1.5 picoseconds "on" and 20 nanoseconds "off" or, alternatively, 20 nanoseconds "on" and 1.5 picoseconds "off", of the modulator and of the desired imagewise area, such as a dot or pixel shape of about 6 microns in diameter or of about 6 microns per edge in a square shape, on the photon-absorbing layer of the optical shutter.

In one embodiment, wherein the reverse reaction is induced by radiation selected from the group consisting of ultraviolet radiation, visible radiation, and infrared radiation, a second modulator is interposed between the source of the radiation and the optical shutter to provide a desired length of imaging time and a desired imagewise area for the reverse reaction of the optical shutter by the radiation. Suitable modulators may be any of the variety of light modulators, such as electro-optic modulators, known in the art of light modulators, depending on the requirements for the "on-off" imaging, such as described above for the first modulator, and of the desired imagewise area, such as a dot or pixel shape of about 6 microns in diameter or of about 6 microns per edge in a square shape, on the photon-absorbing layer of the optical shutter. In one embodiment, the wavelength of the photons to form the reaction product is different from the wavelength of the radiation inducing the reverse reaction.

In one embodiment, the source of the photons is an electroluminescent light-emitting device, as known in the art of inorganic and organic electroluminescent light-emitting devices (LEDs). In one embodiment, the light-emitting device has a plurality of light-emitting pixels having a circumference and an intermittent light emission to provide a desired length of imaging time, such as 1.5 picoseconds of "on" time with 20 nanoseconds of "off" time and a desired imagewise area, such as a dot or a pixel shape of about 6 microns in diameter or of about 6 microns per edge in a square shape, for the imaging of the optical shutter by the photons. In one embodiment, wherein the reverse reaction is induced by radiation selected from the group consisting of ultraviolet radiation, visible radiation, and infrared radiation, a second electroluminescent light-emitting device with a plurality of light-emitting pixels having a circumference and an intermittent light emission provides a desired length of imaging time, such as 1.5 picoseconds of "on" time and 60 nanoseconds of "off" time, and a desired imagewise area, such as a dot or a pixel shape of about 6 microns in diameter or of about 6 microns per edge in a square shape, for the reverse reaction of the optical shutter by the radiation. In one embodiment, the wavelength of the photons to form the reaction product is different from the wavelength of the radiation inducing the reverse reaction The organic radical cation may be a variety of salts of an aminium radical cation. The choice of the counteranion for the salt depends on a variety of factors such as, for example, the desired speed of the photo-induced reaction to form the reaction product, the desired speed of the reverse reaction of the reaction product to regenerate the starting organic free radical compound, and the required stability of the photon-absorbing layer against degradation by oxygen, moisture, and the photon exposures and reverse reactions during the operation of the reversible optical shutter.

For example, an anthrasemiquinone radical anion is a type of counteranion to use with an aminium radical cation, such as an IR-165 type aminium radical cation, since the anthrasemiquinone radical anion is an electron-donating material which may participate by being oxidized in the photon-induced reduction of the aminium radical cation and also may participate in the reverse reaction of the reaction product to regenerate the starting aminium radical cation by a simultaneous reverse reduction to reform the anthrasemiquinone radical anion, particularly when the reverse reaction is induced by ultraviolet, visible, or infrared radiation absorbed by the oxidation product, such as the corresponding anthraquinone, of the anthrasemiquinone radical anion. By the proper selection of the type of anthrasemiquinone radical anion derivative, the anthrasemiquinone radical anion of the combined aminium radical cation-anthrasemiquinone radical anion salt may be the organic free radical that absorbs the photons to form the reaction product having a change in absorption at the wavelength, and the aminium radical cation may participate in promoting this photon-induced reaction and in promoting the reverse reaction to regenerate the starting anthrasemiquinone radical amon.

The wavelength at which the optical shutter has the states of low and high absorption may be varied depending on the product application by the selection of the organic free radical compound and by the total composition of the photon-absorbing layer. Suitable wavelengths include, but are not limited to, the range of 400 to 2000 nm. The wavelength may be a single wavelength or a range of multiple wavelengths. In one embodiment, the wavelength is a wavelength from 400 to 1000 nm. In one embodiment, the wavelength is a wavelength from 1000 to 1400 nm. In one embodiment, the wavelength is a wavelength from 1400 to 1600 nm, preferably 1520 to 1580 nm and more preferably 1500 to 1700 nm, for applications in fiber optics communications channels.

The levels of absorption of the states of low and high absorption may be varied depending on the product application by the selection of the type and amount of the free radical compound and by the total composition of the photon-absorbing layer. Typically, the change in absorption at the wavelength is the primary property and may be a range of values from, for example, 0.1 in optical density to greater than 3.0 in optical density, depending on the product application. For example, for a typical application of an optical shutter in an optical switch array in a fiber optics communications channel, the optical density of the low state of absorption at the wavelength, such as 1620 nm, should be as low as possible, such as less than 0.01 or completely transparent, and the optical density of the high state of absorption at the wavelength should be very high, such as 3.1 or greater, to provide the contrast ratio of greater than 30 dB.

In the example of the optical shutter with a photon-absorbing layer comprising IR-165 described above, the absorption of the photons images the optical shutter from the first state of low absorption to the second state of high absorption. Depending on the requirements for the optical shutter in the specific product application, it is readily possible to modify the photon-absorbing layer so that the absorption of photons images the optical shutter from the second state of high absorption to the first state of low absorption. For example, the photon-absorbing layer may comprise IR-126 or a similar aminium radical cation and the photon-absorbing layer may comprise an oxidative, electron-accepting matrix of polymers, counteranions, and other additives around the aminium radical cation. Upon imaging of this optical shutter by photons, for example, at 980 nm, the IR-126 type aminium radical cation forms a reaction product, such as a one-electron oxidation product that is the same or similar to IR-165. Prior to the absorption of photons, the optical shutter has a state of high absorption, such as an optical density of 3.1 due to the IR-126 or similar organic free radical compound, at a wavelength, such as 1620 nm. After the absorption of photons and the formation of the reaction product, the optical shutter has a state of low absorption, such as an optical density of less than 0.05 due to IR-165 or similar organic free radical compound, at the wavelength, such as 1620 nm. The reverse reaction of the optical shutter, as described heretofore, regenerates the starting free radical compound, IR-126 type radical cation, and returns the optical shutter to the state of high absorption at the wavelength, such as 1620 nm. Thus, this embodiment of the optical shutter of the present invention is also characterized by being reversibly imageable between the first and second states of absorption at the wavelength.

In one embodiment of the optical shutters of this invention, the reaction product forms in less than 1 nanosecond after the absorption of the photons by the free radical compound, preferably forms in less than 0.1 nanoseconds after the absorption of the photons, more preferably forms in less than 0.01 nanoseconds after the absorption of the photons, and most preferably forms in less than 0.001 nanoseconds after absorption of photons by the free radical compound. The formation of the reaction product at speeds of less than 0.001 nanoseconds or 1 picosecond is particularly advantageous for product applications in fiber optics communications channels where nanosecond optical data packet switching is desired.

Organic free radical compounds, such as aminium radical cations, are particularly suitable for sub-picosecond speeds of forming the reaction product, particularly by an photon-induced electron transfer reaction where no covalent bond breaking is required. The fact that IR-165 has a sub-picosecond conversion of photons to heat in certain types of photon-absorbing layers but still exhibits some reversible formation of IR-126 or a similar compound or, alternatively, some reversible formation of a blue, organic free radical oxidation product, illustrates that the speed of formation of these reaction products is fast enough to compete with the sub-picosecond photon-to-heat conversion and may, in fact, reversibly occur to a significant extent with some heat formation during the reverse reaction during the photon excitation of the IR-165 containing layer when the photon excitation times are long, such as greater than 3 picoseconds, especially since photon-induced electron transfer reactions are known to occur in sub-picosecond times as fast as 40 femtoseconds and to be reversible by dark reactions at speeds as fast as 2 to 3 picoseconds.

The composition of the photon-absorbing layer may be varied to maximize the efficiency of the formation of the reaction product and to minimize direct photon-to-heat and photon-to-luminescence conversions with a target to approach a quantum efficiency of 100% or 1.0 for the conversion of each photon absorbed to form a molecule of reaction product. This efficiency would be advantageous in reducing the amount of photons which are needed for imaging of the optical shutter. The very intense absorptions of the organic free radicals are advantageous in making photon-absorbing layers with a high optical density at the wavelength of the photons used to form the reaction product, thus providing a high per cent absorption of these incident photons.

In one embodiment of the optical shutters of this invention, the reaction product is an oxidation product of the free radical compound, such as, for example, an one-electron oxidation product or a two-electron oxidation product. IR-126 as the free radical compound and IR-165 as the reaction product is an example of the reaction product being an one-electron oxidation product. In one embodiment, the reaction product is a reduction product of the free radical compound, such as, for example, an one-electron reduction product and a two-electron reduction product. IR-165 as the free radical compound and IR-126 as the reaction product is an example of the reaction product being an one-electron reduction product.

In addition to the organic free radical compound, the photon-absorbing layer of the optical shutter of the present invention may comprise other materials to provide mechanical integrity to the layer and to optimize the formation of the reaction product and the reverse reaction to regenerate the starting organic free radical. Suitable materials for the photon-absorbing layer include, but are not limited to, organic polymers such as polycarbonate and cellulosics, inorganic glasses, such as a porous grade of silica glass as known in the art of inorganic glasses, and one or more inorganic xerogel layers, as known in the art of xerogel layers. Because of the small sizes possible for the optical shutter of this invention, organic polymers and inorganic xerogel layers are preferred because, unlike inorganic glasses, they are known to be readily fabricated in layers with thicknesses of less than 8 microns by coating and other deposition processes known in the art of manufacturing layers with thicknesses of 0.1 to 8 microns. The one or more inorganic xerogel layers typically have a nanoporous structure with average pore diameters in the range of 0.5 to 300 nm, which may be utilized advantageously to be filled partly or completely with the organic free radical compound and other materials, such as polymeric materials, electron-accepting compounds, and electron-donating compounds, to provide a nanocomposite photon-absorbing layer.

In one embodiment of the optical shutter of the present invention, the optical shutter comprises a metallized layer on at least one side of the photon-absorbing layer, preferably on the side through which the photons enter the photon-absorbing layer to form the reaction product. In one embodiment, the metallized layer comprises aluminum. The metallized layer is typically very transparent, such as an optical density of less than 0.05 at the wavelength of the states of low and high absorptions of the optical shutter. These low absorptions of the metallized layer may be obtained by using extremely thin layers of the metal, such as less than 10 Angstroms in thickness. The metallized layer may be utilized to provide reflectivity at the surface of the optical shutter which is reversibly increased, for example, from less than 1% reflective when the optical shutter is in the first state of low absorption to more than 90% reflective when the optical shutter is in the second state of high absorption, simultaneous with the imaging of the optical shutter from "transparent" to "opaque" and back to "transparent". Also, the metallized layer may be utilized to provide a heat conduction path to dissipate heat generated during the imaging of the optical shutter by connection to a heat sink, such as a larger volume of a metal. For example, aluminum is known to convert absorbed photons to heat and to conduct heat to adjacent areas at speeds of about 1 picosecond.

In one embodiment, the optical shutter of this invention further comprises a surface layer having a low reflectivity state, such as a 45° reflectivity of less than 1% at the wavelength of the states of low and high absorptions, wherein the optical shutter is characterized by the absorption of the photons by the free radical compound to form a high reflectivity state, such as a 45° reflectivity of more than 90% at the wavelength of the states of low and high absorptions, of the surface layer; and wherein the optical shutter is characterized by being reversibly imageable between the low and high reflectivity states. Preferably, the surface layer is on the side of the photon-absorbing layer through which the photons enter to be absorbed to form the reaction product. In one embodiment, the absorption of the photons images the optical shutter from the first state of low absorption and the low reflectivity state and to the second state of high absorption and the high reflectivity state. Suitable materials for the surface layer include, but are not limited to, metals that melt at a temperature above 25° C. and below 700° C., and preferably below 200° C. The surface layer may include an organic free radical compound selected for efficient photon-to-heat conversion and other organic materials, such as, for example, those that undergo a rapid reversible melt-solidification process that enhances the reversible speed and the per cent reflectivity of the high reflectivity state. The metallized layer on at least one side of the photon-absorbing layer may enhance the efficiency of the reversible imaging.

The optical shutter of the present invention may be utilized in a variety of product applications. In one embodiment, the optical shutter is utilized in an optical switch array for a fiber optics communications channel. In one embodiment, the optical shutter is utilized in a protection device for protection of eyes or sensors from a source of radiation. In one embodiment, the optical shutter is utilized in a security protection system based on detecting the change in absorption upon imaging of the optical shutter in the security protection system by radiation selected from the group consisting of ultraviolet radiation, visible radiation, and infrared radiation. In one embodiment, the optical shutter is utilized in a viewing lens of an eyewear device.

Yet another aspect of this invention pertains to an optical shutter comprising an organic free radical compound in which the free radical compound is characterized by forming an oxidized or a reduced product having a change in absorption in a visible wavelength region as a result of a photo-induced electron transfer reaction of the free radical compound, wherein in one embodiment, the change in absorption is reversible. In one embodiment, the change in absorption is reversible, and the optical shutter is utilized in a viewing lens of an eyewear device, such as, for example, in sunglasses.

Another aspect of the present invention pertains to an optical shutter comprising an organic free radical compound in which the free radical compound is characterized by forming an oxidized or a reduced product having a change in absorption in a visible or a near-infrared wavelength region as a result of a photo-induced electron transfer reaction of the free radical compound. In one embodiment, the optical shutter is utilized in a laser protection device for protection of eyes or sensors from a source of laser radiation. In one embodiment, the optical shutter is utilized in a security protection system based on detecting the change in absorption upon exposure of the optical shutter in the security protection system to high intensity radiation selected from the group consisting of ultraviolet radiation, visible radiation, and infrared radiation. The high intensity radiation may be produced by a pulsed laser which provides a unique light intensity to trigger the optical shutter, which is not activated under ambient room light and other conventional conditions.

The organic nature of the organic free radical compounds and the optical shutter of the present invention are advantageous for ease of fabrication, such as by conventional methods of coating or plastic molding, in comparison to inorganic glass materials typically used in all-optical or hybrid optical shutters and switches. Since only the area of the photon-absorbing layer that receives photons is imaged and acts as an optical shutter, the optical shutter may be made for ease of fabrication and possible extension of its product lifetime with a photon-absorbing layer of greater surface area than is needed. This excess photon-absorbing layer may be utilized later if the original optical shutter has degraded and a new optical shutter is needed by re-positioning the optical shutter to expose this excess photon-absorbing layer as the optical shutter in the product application.

The unique properties of the optical shutter of the present invention are adapted for use in a variety of optical components for fiber optics communications channels, such as, for example, for an optical switch array, an optical buffer, an optical router, and a tunable optical gain filter.

The optical shutter of the present invention may be utilized in any of the optical switch arrays known in the art of fiber optics communications channels where the optical switch arrays utilize one or more optical shutters, or optical gates as optical shutters are typically referred to in fiber optics applications, that operate by a reversible imaging between states of low and high absorptions, including where there is also simultaneous reversible imaging between states of low and high reflectivity. Each of these types of reversible imaging of optical shutters or optical gates have been described herein for the optical shutter of this invention.

Referring to FIG. 1, one embodiment of an optical switch array 100 utilizing the optical shutters of this invention is illustrated. A first channel 1 having an input optical signal 1(IN) at the wavelength, such as, for example, 1620 nm, of the specific communications channel directs the input optical signal 1(IN) through an optical splitting device 11 to divide the optical signal into two optical signals, preferably of equal signal amplitude. One of these two optical signals is directed at an optical shutter 3 having a photon-absorbing layer 4 which, when the photon-absorbing layer absorbs photons from a light source such as a light source above or below the plane of the optical path of the optical signals in FIG. 1, an organic free radical compound in the photon-absorbing layer absorbs the photons and forms a reaction product providing a change in absorption at 1620 nm, such as, for example, a decrease in optical density at 1620 nm from 3.10 to 0.03. While the reaction product is formed and the optical density at 1620 nm is very low, this one of the two optical signals passes through optical shutter 3 and is directed by mirrors 5, or alternatively by bends in a waveguide carrying the signal or other direction-changing optical components known in the art of fiber optics communications channels, to an optical combining device 22 to combine the optical signal with any other optical signals also directed to the combining device 22 at the same time and to then direct the optical signal to a second channel 2 where the optical signal becomes an output optical signal 2(OUT) at 1620 nm. When the reaction product undergoes the reverse reaction to regenerate the starting organic free radical, the optical density at 1620 nm becomes very high, and optical signals can not pass through optical shutter 3.

Optionally, the optical switch array of this embodiment may comprise an additional optical shutter 6 having a photon-absorbing layer 7 which, when the photon-absorbing layer absorbs photons from a light source such as a light source above or below the plane of the optical path of the optical signals in FIG. 1, an organic free radical compound in the photon-absorbing layer 7 absorbs the photons and forms a reaction product providing a change in absorption at 1620 nm, such as, for example, an increase in optical density at 1620 nm from 0.03 to 3.10. While this reaction product is formed and the optical density at 1620 nm is very high, the optical signal can not pass through optical shutter 6. Prior to any absorption of photons or when the reaction product undergoes the reverse reaction to regenerate the starting organic free radical, the optical density at 1620 nm is very low, and this other of the two optical signals can pass through optical shutter 6 and is directed by mirrors 5, or alternatively by bends in a waveguide carrying the signal or other direction-changing optical components known in the art of fiber optics communications channels, to an optical combining device 21 to combine the optical signal with any other optical signals also directed to the combining device 21 at the same time and to then direct the optical signal to channel 1 where the optical signal becomes an output optical signal 1(OUT) at 1620 nm.

Thus, in FIG. 1, optical shutter 3 is an "opaque-to-transparent" optical shutter which may be reversibly imaged to drop an optical signal from channel 1 to channel 2. Optical shutter 6 is a "transparent-to-opaque" optical shutter which may be alternatively also reversibly imaged and utilized to stop the optical signal from channel 1 from continuing in channel 1 after passing through the switch array 100. Similarly, optical shutters 3 and 6 after the optical splitting device 12 may be utilized to drop an input optical signal 2(IN) from the second channel 2 to the first channel 1 where the optical signal becomes an output optical signal 1(OUT) and/or stop the input optical signal 2(IN) from passing through to channel 2 after the switch array 100 to become an output optical signal 2(OUT).

Thus, one aspect of the optical switch arrays of this invention pertains to an optical switch array comprising one or more input optical signal channels, two or more output optical signal channels, and one or more optical shutters, which one or more optical shutters are imageable by photons and have a first state of a low absorption at a wavelength and a second state of a high absorption at the wavelength, at least one of the one or more optical shutters comprising a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein at least one of the one or more shutters is characterized by being reversibly imageable between the first and second states of absorptions, and wherein the optical switch array is characterized by being capable of switching an optical signal of the wavelength entering the switch array from a first input optical signal channel to exiting the switch array in a second output optical signal channel.

In one embodiment of the optical switch array of the present invention, the absorption of the photons images at least one of the one or more optical shutters from the first state to the second state, the optical signal entering the optical switch array from the first channel is split by an optical signal splitting device into two or more optical signals in two or more channels, and the at least one of the one or more optical shutters is interposed in an optical path for at least one of the two or more optical signals between the optical splitting device and the second channel for outputting the at least one of the two or more optical signals. In one embodiment, the absorption of the photons images at least one of the one or more optical shutters from the second state to the first state, the optical signal entering the optical switch array from the first channel is split by an optical signal splitting device into two or more optical signals in two or more channels, and at least one of the one or more optical shutters is interposed in an optical path between the optical splitting device and one or more reflective surfaces, such as a mirror, which one or more reflective surfaces are part of an optical path to the second channel.

In one embodiment of the optical switch array of this invention, at least one of the one or more optical shutters further comprise a surface layer having a low reflectivity state at the wavelength, wherein the at least one of the one or more optical shutters is characterized by absorption of the photons to form a surface layer having a high reflectivity state and by a reverse reaction of the high reflectivity state to regenerate the low reflectivity state of the surface layer; and wherein the at least one of the one or more optical shutters is characterized by being reversibly imageable between the low and high reflectivity states.

Figure 2:
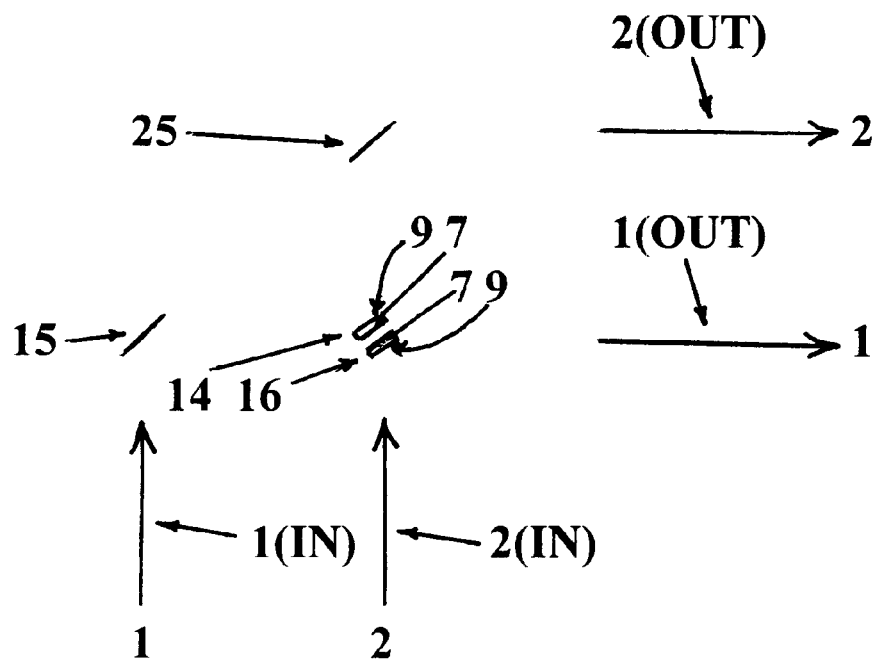
FIG. 2 shows another embodiment of an optical switch array utilizing the optical shutters of the present invention.

In one embodiment, the absorption of the photons images the at least one of the one or more optical shutters from the first state of low absorption to the second state of high absorption, thereby insuring that no optical signal is transmitted through the photon-absorbing layer while the optical signal is simultaneously reflected from the surface layer having a high reflectivity state. Referring to FIG. 2, one embodiment of an optical switch array 110 utilizing the optical shutters of this invention having reversible imaging between both low and high absorption states of a photon-absorbing layer and between low and high reflectivity states of a surface layer, is illustrated. A first channel 1 having an input optical signal 1(IN) at the wavelength, such as, for example, 1620 nm, of the specific communication channel directs the input optical signal 1(IN) to a reflective surface 15, such as a mirror. The reflective surface 15 then directs the input optical signal 1(IN) at an optical shutter 14 comprising a surface layer 9 having a low reflectivity state and a photon-absorbing layer 7 comprising an organic free radical compound. When the photon-absorbing layer 7 of optical shutter 14 absorbs photons from a light source such as a light source above or below the plane of the optical path of the optical signals in FIG. 2, the organic free radical compound absorbs the photons and forms a reaction product providing a change from a state of low absorption to a state of high absorption at 1620 nm and simultaneously the surface layer 9 of optical shutter 14 is imaged from the low reflectivity state to a second state of high reflectivity. While the reaction product is formed and the optical density and the reflectivity at 1620 nm are very high, this optical signal is reflected to a reflective surface 25, such as a mirror. The optical signal is then reflected by reflective surface 25 to a second channel 2 where the optical signal becomes an output optical signal 2(OUT) at 1620 nm. Prior to any absorption of photons by optical shutter 14 or when the reaction product and the surface layer with the high reflectivity state undergo the reverse reaction to regenerate the starting organic free radical compound and the surface layer with a low reflectivity state, the optical density and the reflectivity at 1620 nm are very low, and the optical signal can pass through optical shutter 14 and optical shutter 15 to channel 1 where the optical signal becomes an output optical signal 1(OUT) at 1620 nm.

Similarly, a second channel 2 having an input optical signal 2(IN) at the wavelength, such as, for example, 1620 nm, of the specific communications channel directs the input optical signal at an optical shutter 16 comprising a surface layer 9 having a low reflectivity state and a photon-absorbing layer 7 comprising an organic free radical compound. When the photon-absorbing layer 7 of optical shutter 16 absorbs photons from a light source such as a light source above or below the plane of the optical signals in FIG. 2, the organic free radical compound absorbs the photons and forms a reaction product providing a change from a state of low absorption to a state of high absorption at 1620 nm and simultaneously the surface layer 9 of optical shutter 16 is imaged from the low reflectivity state to a second state of high reflectivity. While the reaction product is formed and the optical density and the reflectivity at 1620 nm are very high, this optical signal is reflected to channel 1 where the optical signal becomes an output optical signal 1(OUT) at 1620 nm. Prior to any absorption of photons by optical shutter 16 or when the reaction product and the surface layer with the high reflectivity state undergo the reverse reaction to regenerate the starting organic free radical and the surface layer with a low reflectivity state, the optical density and the reflectivity at 1620 nm are very low, and the optical signal can pass through optical shutter 16 and optical shutter 14 to the reflective surface 25. The optical signal is then reflected by reflective surface 25 to channel 2 where the optical signal becomes an output optical signal 2(OUT) at 1620 nm.

Optical shutter 16 and optical shutter 14 are in close proximity and form a double optical shutter assembly 18, but the light sources to image the optical shutters may be collimated and focused to provide photons that image only a single optical shutter in the optical switch array, such as only imaging optical shutter 16 without imaging optical shutter 14 of double optical shutter assembly 18.

Many variations and combinations of the optical shutters of the present invention with their flexibility to be "transparent-to-opaque" optical shutters, "opaque-to-transparent" optical shutters, and "transparent-to-reflective" optical shutters, as described herein, may be utilized in the designs of the optical switch arrays of this invention, including use in optical switch arrays known in the art where the designs require "transparent-to-opaque" opaque shutters, "opaque-to-transparent" optical shutters, and "transparent-to-reflective" optical shutters.

The 2×2 optical switch array of FIG. 2 may be readily expanded to larger arrays, such as, for example, to 1200× 1200 optical switch arrays where there may be, for example, 15 fiber channels of optical signals with each channel having 80 different wavelengths, such as wavelengths ranging from 1530 to 1620 nm. The "transparent-to-reflective" type of optical shutter illustrated in FIG. 2 with its double optical shutter assembly of two optical shutters in close proximity may have an overall size as small as, for example, about 8 microns per edge of a cubic shape. If the optical switch array operates by having the 15 channels of each specific wavelength be demultiplexed and input to the optical switch array in a single plane with the 15 channels of the other 79 specific wavelengths being likewise successively positioned and provided with demultiplexed signals in 79 individual planes parallel and above or below this first plane and further operates by having the optical shutters of each plane is offset enough from the optical shutters of any other plane that the source of light from above or below the planes of the optical switch array may image a single individual optical shutter without imaging any other optical shutters, the optical switch array may have a very compact size. For example, assuming a 8 micron per edge of a cubic shape for double optical shutter assembly 18 in FIG. 2, the dimensions of a corresponding 1200×1200 optical switch array based on this type of "transparent-to-reflective" optical shutter and double optical shutter assembly may be estimated to be as small as about 8 microns times 15 channels or 120 microns in one dimension in a single plane of 15 channels, about 8 microns times 80 wavelengths or 640 microns in depth to account for the total of 80 planes for each of the individual wavelengths, and about 8 microns times 80 wavelengths times 15 channels in the second dimension in each single plane of 15 channels to account for the offsetting to provide the ability to image only a single optical shutter without imaging any other optical shutters. This extremely small size is very advantageous for cost, ease of manufacturing, and space considerations for both optical switch arrays and for the light sources to image the optical switch arrays.

In one embodiment of the optical switch arrays of this invention, the optical switch array further comprises an optical wavelength conversion layer to convert the optical signal at the wavelength, such as 1542 nm, to a second different wavelength, such as 1544 nm. This provides additional flexibility in switching the optical signals to other channels, such as to other available wavelengths in the same optical fiber. Preferred are optical wavelength conversion layers which are capable of converting the optical signal to a different wavelength that is one, two, or three wavelengths above or below the wavelength of the input optical signal. Stable organic free radical compounds typically have large molecular structures in order to stabilize the free radical moiety. As such, they have large molecular cross-sections, very high absorption extinction coefficients, and often sub-picosecond conversions of photons absorbed to heat, electron transfer reaction, and luminescence. Accordingly, these organic free radical compounds may be modified to provide non-linear optical properties that alter the frequency of the photons passing through a layer comprising the organic free radical compound and thereby provide a wavelength conversion to the photons. In one embodiment, the optical wavelength conversion layer comprises an organic free radical compound.

The optical shutters of the present invention may be utilized to prepare an optical buffer to store optical signals for a specified delay time before sending the optical signals on to their next destination in the optical network system. As the bit rates and the quantities of optical signals increase, a situation known generally as data contention, as known in the art of fiber optics communication channels, becomes more prevalent. This is especially a technical challenge as the fiber optics communication channels evolve to nanosecond optical burst switching and nanosecond optical packet switching. Data contention involves, for example, two different packets of optical signals being in contention at the same time for transmission to their next destination in the optical network. To resolve this contention, one of the packets of optical signals is delayed in its transmission, such as, for example, by being placed into a fiber delay line where the speed of light (0.3 mm per picosecond) may be used to provide the specified delay time. These fiber delay lines are expensive, complex, space-consuming, and relatively inflexible to making variations in the desired delay time. These disadvantages may be overcome by utilizing the optical shutters of the present invention in an optical buffer.

Figure 3:
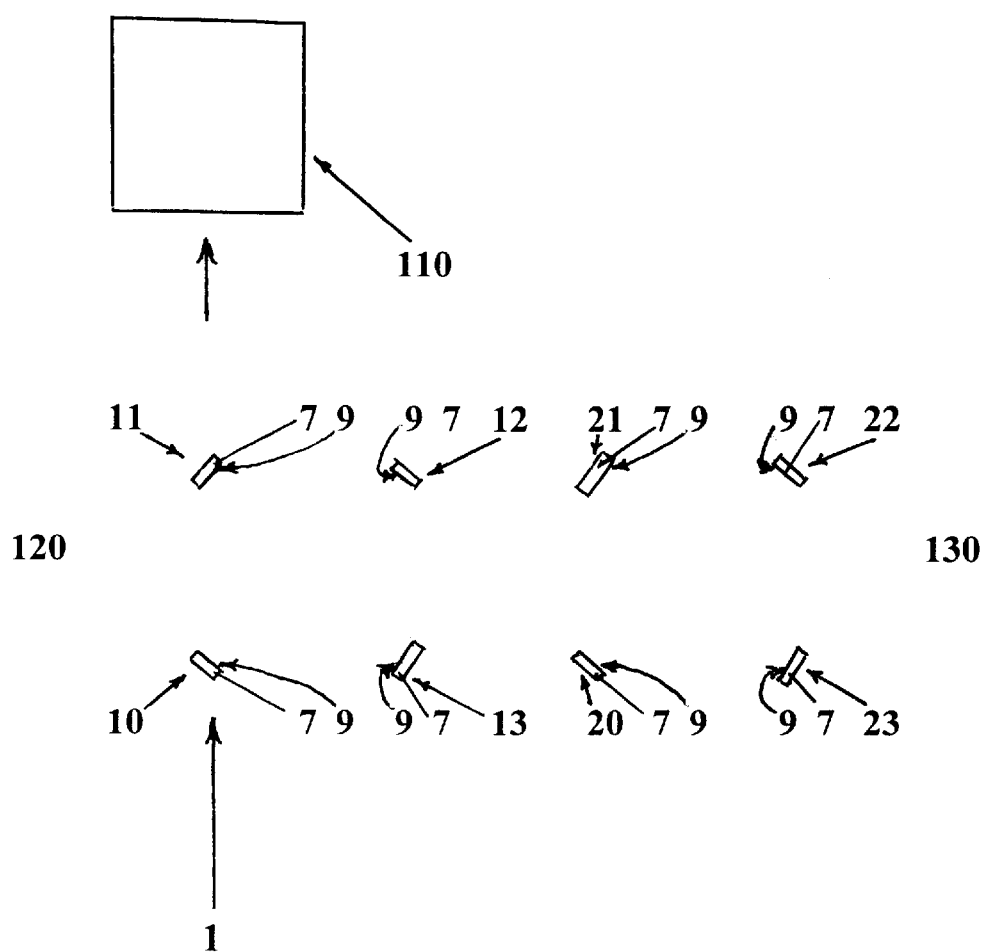
FIG. 3 illustrates one embodiment of an optical buffer utilizing the optical shutters of the present invention.

Referring to FIG. 3, in one embodiment of an optical buffer, utilizing the optical shutters of this invention having reversible imaging between both low and high absorption states of a photon-absorbing layer and between low and high reflectivity states of a surface layer of this invention, is illustrated. An optical signal 1 at a wavelength, such as, for example, 1620 nm, or at multiple wavelengths, such as, for example, 80 wavelengths in the range of 1530 to 1620 nm, is directed to an optical network destination 110, such as, for example, an optical switch array for network optical core switching or an optical amplifier or an electro-optic switch array for network edge switching, as described for example in "Architectural and Technological Issues for Future Optical Internet Networks," in *IEEE Communications Magazine*, September 2000, pages 82 to 92, and references therein, by Listanti et al., the disclosures of which are fully incorporated herein by reference. Optical signal 1 must pass through optical shutters 10 and 11 of optical buffer 120 prior to continuing on to optical network destination 110. If a data contention or other reason to delay the transmission of optical signal 1 occurs, optical shutter 11 comprising a surface layer 9 of a low reflectivity state and a photon-absorbing layer 7 is imaged, as described previously for the similar optical shutters 14 and 16 in FIG. 2. Optical signal 1 is then reflected to optical shutter 12 comprising a surface layer 9 of a low reflectivity state and a photon-absorbing layer 7 and, if delay in optical buffer 120 is desired, optical shutter 12 is imaged, as described previously for the similar optical shutters 14 and 16 in FIG. 2. Optical signal 1 is then reflected to optical shutter 13 comprising a surface layer 9 of a low reflectivity state and a photon-absorbing layer 7 and is imaged, as described previously for the similar type of optical shutters 14 and 16 in FIG. 2. Optical signal 1 is then reflected to optical shutter 10 comprising a surface layer 9 of a low reflectivity state and a photon-absorbing layer 7 and is imaged, as described previously for the similar type of optical shutters 14 and 16 in FIG. 2. Optical signal 1 is then reflected to optical shutter 11, which by the time optical signal 1 has traveled around optical buffer 120, has undergone the reverse reaction to regenerate the states of the low absorption and the low reflectivity.

If no further delay is required, optical shutter 11 is not imaged, and optical signal 1 continues on to optical network destination 110. If further delay is required, optical shutter 11 is imaged, and optical signal 1 is reflected again to optical shutter 12 and the process of storing or delaying optical signal 1 in optical buffer 120 continues until no further delay is required when optical signal 1 reaches optical shutter 11. If only a single optical buffer is required, optical shutters 12 and 13 do not need to be optical shutters and may be permanent reflective surfaces, such as mirrors. At 0.3 mm per picosecond for the speed of light, the distance traveled by optical signal 1 in optical buffer 120 may be set to provide the desired delay time in a single loop or in multiple loops around optical buffer 120. If the desired delay time varies and can not be met with a single loop or any number of multiple loops, the distance for a single loop in optical buffer 120 may be adjusted by moving two or more of the four optical shutters or mirrors to create a new distance for a single loop or any number of multiple loops which matches the new desired delay time.

If delay or optical signal storage in optical buffer 130 is desired instead, optical shutter 12 is not imaged, and optical signal 1 continues on to optical buffer 130. Optical shutters 20, 21, 22, and 23 have the same layers and alternative permanent reflective surfaces as described for optical shutters 10, 11, 12, and 13, respectively, in FIG. 3. Thus, it can be seen that optical signal 1 may be circulated in a loop around optical buffer 130 by imaging the optical shutters and may continue back to optical buffer 120 if optical shutter 20 is not imaged when optical signal 1 reaches optical shutter 20. When optical signal 1 is back in optical buffer 120, optical signal 1 may be circulated in a loop around optical buffer 120 by imaging the optical shutters and may continue on to optical network destination 110 if optical shutter 11 is not imaged when optical signal 1 reaches optical shutter 11.

Similar optical buffers may be provided in other locations adjacent to optical buffers 120 and 130 in a manner similar to which optical buffers 120 and 130 are adjacent to each other and may also be accessed by optical signal 1. Additional optical buffers would provide additional buffering capacity and additional flexibility in handling a variety of optical data packets which may have a wide range of byte sizes from, for example, 50 bytes to 1500 bytes and thus may have varying desired delay times which are not all integer multiples of each other. As one alternative to additional optical buffers connected optically to a first optical buffer, a single optical buffer may have more than two optical shutters on each edge of the optical buffer, such as, for example, 100 optical shutters opposite to each other on each edge instead of the two optical shutters opposite to each other on each edge in optical buffers 120 and 130, so that the delay time may be readily changed by the choice of which of the optical shutters to image when the optical signal reaches the specific optical shutter.

Thus, one aspect of the optical buffers of this invention pertains to an optical buffer for storing an optical signal for a desired time, which optical buffer comprises at least two optical shutters positioned at first distances and first angles from each other, wherein the at least two optical shutters are imageable by photons and have a first state of a low absorption at a wavelength and a second state of a high absorption at the wavelength, which optical shutters comprise a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein the at least two optical shutters are characterized by being reversibly imageable between the first and second states of absorption; and the at least two optical shutters further comprise a surface layer having a low reflectivity state at the wavelength, wherein the at least two optical shutters are characterized by absorption of said photons to form a surface layer having a high reflectivity state and by a reverse reaction of the high reflectivity state to regenerate the low reflectivity state, wherein the at least two optical shutters are characterized by being reversibly imageable between the low and high reflectivity states; and wherein at least two of the at least two optical shutters are interposed between an input channel carrying the optical signal and an output channel for the optical signal.

In one embodiment of the optical buffers of this invention, the absorption of the photons images the optical shutter from the first state of low absorption to the second state of high absorption. In one embodiment, the optical buffer further comprises two or more reflective surfaces, such as, for example, two or more "transparent-to-reflective" optical shutters or two mirrors, positioned at second distances and second angles from the at least two optical shutters to return the optical signal to at least one of the at least two optical shutters. In one embodiment, the first distances, first angles, second distances, and second angles are selected to return the optical signal in the desired time to one of the at least two optical shutters interposed between the input channel and the output channel. In one embodiment, the first distances, first angles, second distances, and second angles are adjustable to match changes in the desired time for storing the optical signal.

In the optical buffers of the present invention, the photon-absorbing layers of the optical shutter preferably comprise an organic free radical compound, but other materials that induce a reversible "transparent-to-opaque" imaging of the photon-absorbing layer may be utilized.

The optical shutters of the present invention may be utilized in an optical router, where optical header signals in an optical packet or another form of optical signals may be utilized to image an optical switch array and route or direct optical packets to their desired destinations in the optical network. One aspect of the optical router of the present invention pertains to an optical router comprising (a) an input channel comprising a plurality of optical signals having one or more wavelengths; (b) an optical switch array having a plurality of optical shutters; (c) an optical serial-to-parallel shutter interposed between the input channel and the optical switch array, wherein the optical serial-to-parallel shutter is imageable by photons and has a first state of a low absorption of at wavelength and a second state of a high absorption at the wavelength, the optical serial-to-parallel shutter comprising a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein the optical serial-to-parallel shutter is characterized by being reversibly imageable between the first state of low absorption and the second state of high absorption and the absorption of the photons images the optical serial-to-parallel shutter from the second state to the first state; and (d) a light source, such as, for example, positioned to provide photons at an angle less than 90° to a surface of the optical serial-to-parallel shutter; wherein the light source provides photons onto the surface of the optical serial-to-parallel shutter, whereby the optical serial-to-parallel shutter is imaged from the second state to the first state and reversibly back to the second state at different locations on the surface over a period of time and the plurality of optical signals passes through the optical serial-to-parallel shutter at a plurality of locations, wherein the locations are positioned to direct the transmission of an optical signal passing through one of the locations to one of said optical shutters of said optical switch array.

In one embodiment of the optical router of this invention, the plurality of optical signals comprise an optical header of an optical packet. In one embodiment, the optical router further comprises an optical signal amplifier on one or both sides of the optical serial-to-parallel shutter. In one embodiment, the optical router further comprises an optical frequency doubling device on one side of the optical serial-to-parallel shutter to convert the one or more wavelengths of the plurality of optical signals of the input channel to one-half the wavelengths of the one or more wavelengths. In one embodiment, the optical router further comprises one or more optical splitting devices on one side of the optical serial-to-parallel shutter to split the optical signals and one or more frequency doubling devices on one side of the optical serial-to-parallel shutter such that the optical shutters of said switch array are imaged by two different optical signals. In one embodiment, the wavelengths of the two different optical signals are different, the wavelength of one of the two different optical signals is utilized to image a first reaction of the optical shutters of the switch array, and the wavelength of the second of the two different optical signals is utilized to image a reverse reaction of the first reaction.

Figure 4A:
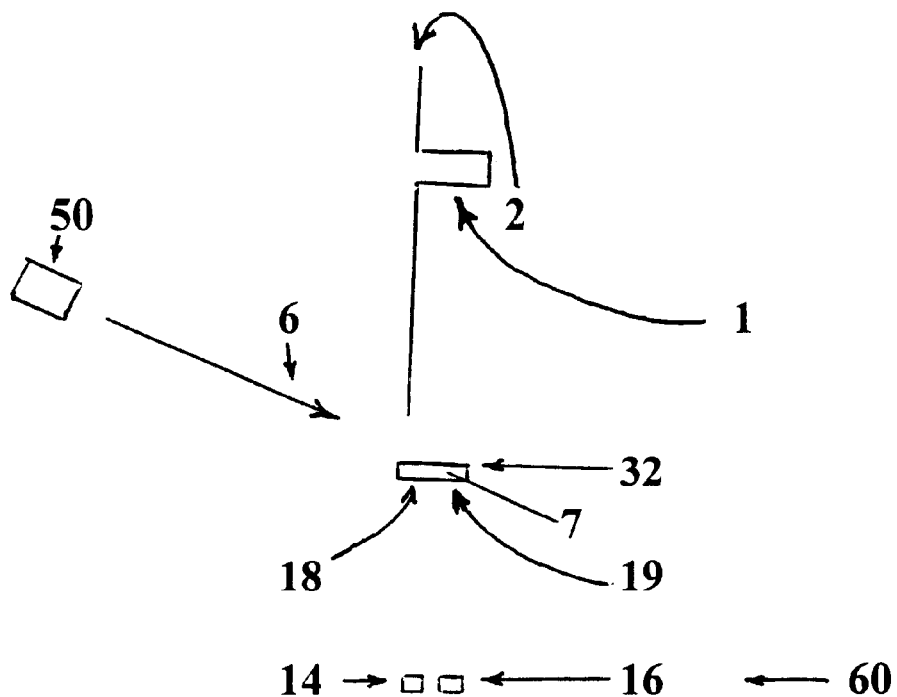
FIG. 4A and FIG. 4B show one embodiment of an optical router utilizing an optical serial-to-parallel shutter of the present invention to image an optical switch array.

Referring to FIG. 4A, one embodiment of the optical router utilizing an optical shutter of this invention is illustrated. An input channel 2 directs an optical signal 1 to an optical serial-to-parallel shutter 32 of the "opaque-to-transparent" type, as described herein, comprising a photon-absorbing layer 7. A light source 50 is positioned to deliver photons at an angle less than 90° to a surface of optical serial-to-parallel shutter 32 and provides a flux 6 of photons to image optical serial-to-parallel shutter 32. Due to the speed of light being 0.3 mm per picosecond and to the varying distances from light source 6 to photon-absorbing layer 7, optical serial-to-parallel shutter 32 is imaged from a state of high absorption to a state of low absorption and reversibly back to the state of high absorption at different locations on the surface over a period of time, and optical signal 1 passes through optical serial-to-parallel shutter 32 at position 19 on the right side of optical serial-to-parallel shutter 32. The location of position 19 transmits optical signal 1 to optical shutter 16 of optical switch array 60, where optical shutter 16 in FIG. 4A may be similar to optical shutter 16 in FIG. 2. Optical signal 1 may comprise an optical header of an optical packet so that optical routing of optical packets may be achieved, especially for nanosecond optical packet switching systems as described in the aforementioned publication by Listanti et al.

If optical signal 1 is not of sufficient intensity or of a suitable wavelength to image optical shutter 16, one or more optical signal amplifiers, as known in the art of optical signal amplifiers, may be added on one or both sides of optical serial-to-parallel shutter 32 to intensify optical signal 1, and an optical frequency doubling device, as known in the art of optical frequency doubling devices, may be added on one side of the optical serial-to-parallel shutter to convert the one or more wavelengths of the optical signals of the input channel to one-half the wavelengths of the one or more wavelengths. Since optical signal 1 from an optical header would typically have wavelengths identical to or close to the wavelengths of the optical data signals passing through optical switch array 60, some type of wavelength conversion, such as by an optical frequency doubling device, typically would be necessary for imaging of optical shutter 16 in the case of an optical header-derived optical signal.

Figure 4B:
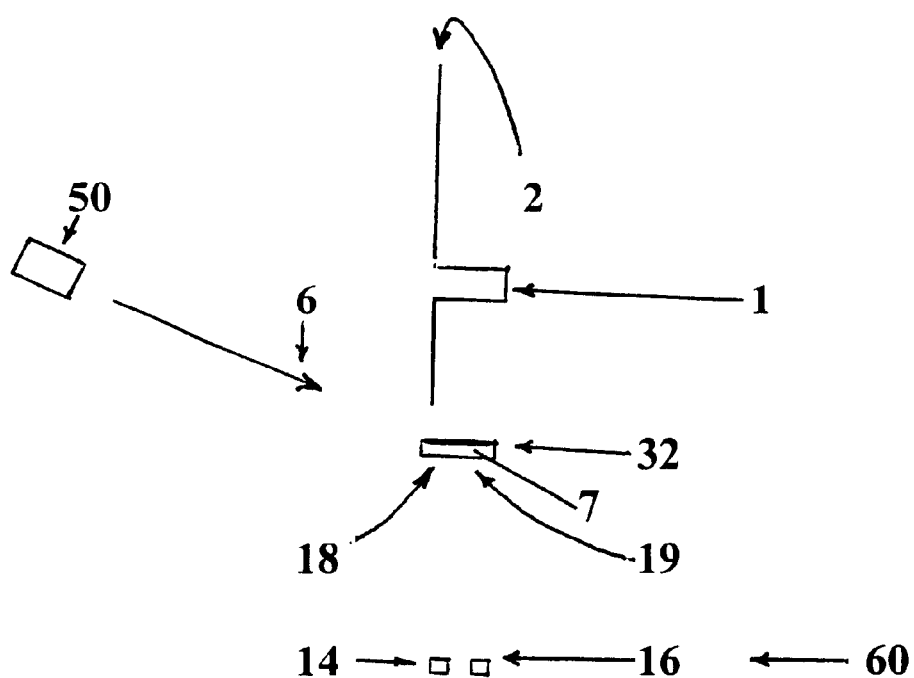

Referring to FIG. 4B, each number has the same meaning as described for FIG. 4A, and the differences between FIG. 4A and FIG. 4B are that, in FIG. 4B, optical signal 1 is earlier in timing, such as, for example, by 1.5 picoseconds as would be the approximate bit spacing in a 640/Gbs optical data rate, compared to the optical signal in FIG. 4A, and consequently, in FIG. 4B, optical serial-to-parallel shutter 32 opens instead in position 18 on its left side to allow optical signal 1 to pass through and be transmitted to optical shutter 14 of optical switch array 60.

Figure 5:
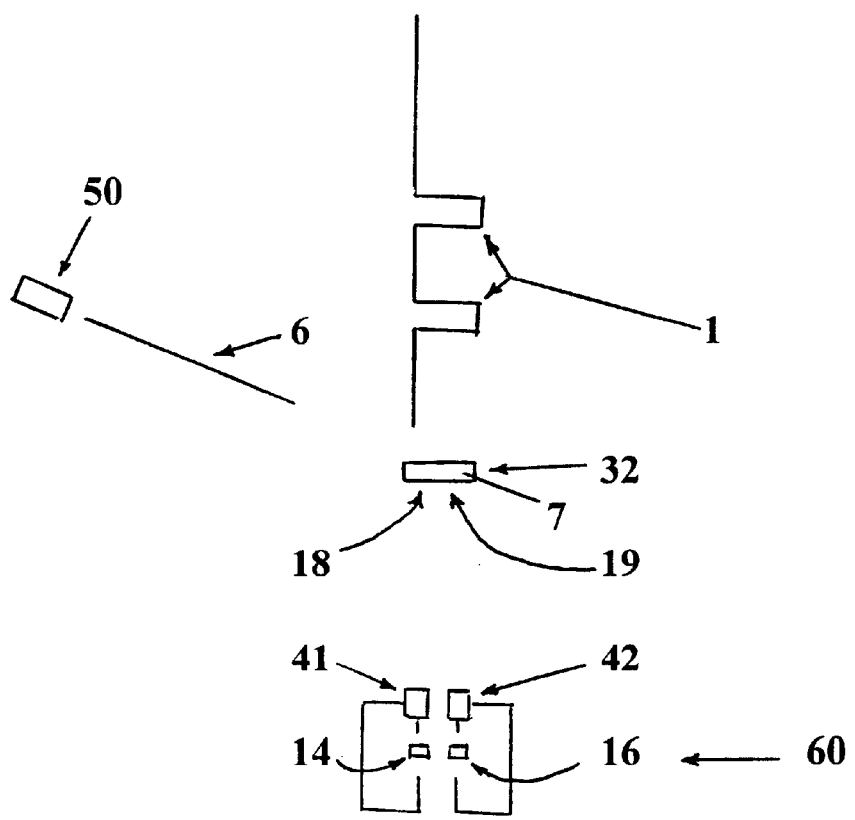
FIG. 5 illustrates another embodiment of an optical router utilizing an optical serial-to-parallel shutter of the present invention to image an optical switch array.

Referring to FIG. 5, light source 50, flux 6 of photons, optical serial-to-parallel shutter 32 comprising photon-absorbing layer 7, positions 18 and 19, optical shutters 14 and 16, and optical switch array 60 are as described for FIGS. 4A and 4B. Optical splitting devices 41 and 42 have been added on one side of optical serial-to-parallel shutter 32 below positions 18 and 19, respectively, to split the optical signal passing through shutter 32 into two optical signals for imaging optical shutters 14 and 16, respectively, by two different optical signals each, preferably from two different sides of the optical shutters of optical switch array 60 and with a time delay introduced into one of the two different optical signals so that it images the optical shutter after the imaging by the other of the two different optical signals and with the wavelengths of the two different optical signals converted to two different wavelengths by frequency doubling or other known techniques for wavelength conversion, if needed for reversibly imaging the optical shutters. Optical signal 1 in FIG. 5 has both optical signals shown in FIGS. 4A and 4B and consequently optical serial-to-parallel shutter 32 is opened in both positions 18 and 19, and the optical signals are transmitted to both optical shutters 14 and 16. With the optical splitting devices 41 and 42, the optical signals are split and directed to two sides, preferably opposite sides and perpendicular to the plane of optical data signals being switched in optical switch array 60.

The optical shutters of the present invention may also be utilized in a tunable optical gain filter, where the amplitude of an optical signal is reduced by a desired amount by passing through the optical gain filter and where the amount of the reduction of the amplitude may be varied or "tuned" by an optical input. The optical signal may be a single wavelength, such as, for example, 1620 nm, and the optical signal may be a range of wavelengths such as, for example, 80 different wavelengths in the range of 1530 to 1620 nm. One aspect of the optical gain filter of this invention pertains to a tunable optical gain filter comprising an optical shutter, wherein the optical shutter is imageable by photons and has a first state of a low absorption at a wavelength and a second state of a high absorption at the wavelength, which optical shutter comprises a photon-absorbing layer, wherein the photon-absorbing layer comprises an organic free radical compound and is characterized by absorption of the photons by the free radical compound to form a reaction product having a change in absorption at the wavelength and by a reverse reaction of the reaction product to regenerate the free radical compound; and wherein the optical shutter is characterized by being reversibly imageable between the first and second states of absorption and the optical gain filter provides a desired per cent transmission of an optical signal at the wavelength. In one embodiment, the optical gain filter comprises one or more interference filter layers to remove wavelengths that are different from the wavelength being filtered to the desired per cent transmission.

The tunable optical gain filter of the present invention may be tuned by varying the intensity of the flux of photons to image the optical shutter. This achieves various per cent transmission levels in the gain filter by taking advantage of the "steady state equilibrium" formed between the starting free radical compound and the reaction product having a change in absorption at the wavelength or wavelengths being filtered. This steady-state condition results from the different speeds of the photo-induced formation of the reaction product and of the reverse reaction to regenerate the starting free radical compound. Alternatively, tuning may be achieved by having the tunable optical gain filter comprise two or more optical shutters of this invention, wherein each one of the two or more optical shutters provides a different per cent transmission of an optical signal at the wavelength being filtered. The desired per cent transmission may then be achieved by imaging the specific one of the two or more optical shutters that provides the desired per cent transmission. Due to the extremely small sizes possible with the optical shutters of the present invention, the tunable optical gain filters may be readily made with two or more optical shutters, such as, for example, with 99 optical shutters to provide each integer of per cent transmission at the wavelength from 1% to 99%, and still have a very small size for the optical gain filter. Also, the tunable optical gain filter could be tunable for acting as a tunable gain filter for two or more different single wavelengths or two or more different ranges of wavelengths by having the tunable optical gain filter comprise two or more optical shutters of this invention, wherein each one of the two or more optical shutters provides a different per cent transmission of an optical signal of a first wavelength or range of wavelengths being filtered and/or provides a different per cent transmission of an optical signal of a second wavelength or range of wavelengths that are different from the first wavelength or range of wavelengths. This may be done, for example, by utilizing 198 optical shutters in the tunable optical gain filter where two sets of 99 optical shutters provide a different per cent transmission of an optical signal of a first wavelength or range of wavelengths with the first set of 99 optical shutters and a different per cent transmission of an optical signal of a second wavelength or range of wavelengths with the second set of 99 optical shutters.

The "transparent-to-opaque" and "opaque-to-transparent" types of optical shutters of this invention, where the absorption of the photons images the optical shutter from the first state to the second state of absorption and from the second state to the first state of absorption, respectively, are particularly suitable for use in the tunable optical gain filters of this invention. For example, the very intense, fairly flat and uniform absorption of IR-126 across the entire 1530 to 1620 nm wavelength region make it a very attractive component of the optical shutters in the tunable optical gain filter, where IR-126 is present either as the reaction product formed or as the starting organic free radical compound. The organic free radicals compounds may be modified chemically to provide a desired "tilt" to their absorption spectrum in the desired wavelength region being filtered to provide an equalizing type tunable optical gain filter for equalizing gain filter applications. Such equalizing gain filter applications are as known in the art of fiber optic communications channels, particularly for equalizing the amplitudes of the multiple wavelengths of optical signals after they have been processed through an optical component, such as an optical switch array or an optical amplifier.

While the invention has been described in detail and with reference to specific and general embodiments thereof, it will be apparent to one skilled in the art that various changes and modifications can be made therein without departing from the spirit and scope thereof.

What is claimed is:

1. An optical shutter imageable by photons and having a first state of a low absorption at a wavelength and a second state of a high absorption at said wavelength, said shutter comprising a photon-absorbing layer, wherein said photon-absorbing layer comprises an organic free radical compound and is characterized by absorption of said photons by said free radical compound to form a reaction product having a change in absorption at said wavelength and by a reverse reaction of said reaction product to regenerate said free radical compound; and wherein said shutter is characterized by being reversibly imageable between said first and second states.

2. The optical shutter of claim 1, wherein said free radical compound is an organic radical cation.

3. The optical shutter of claim 2, wherein said radical cation is an aminium radical cation.

4. The optical shutter of claim 2, wherein said radical cation is a tris (p-butylaminophenyl) aminium salt.

5. The optical shutter of claim 1, wherein said free radical compound is an organic radical anion.

6. The optical shutter of claim 5, wherein said radical anion is an anthrasemiquinone radical anion.

7. The optical shutter of claim 1, wherein said free radical compound comprises one or more organic radical cations and one or more organic radical anions, and further wherein said change in absorption results from forming said reaction product by absorption of said photons by at least one of said one or more radical cations and said one or more radical anions.

8. The optical shutter of claim 1, wherein said free radical compound comprises a salt of a radical cation and a radical anion.

9. The optical shutter of claim 1, wherein the difference in absorption between said first and second states at said wavelength is greater than 0.1 in optical density.

10. The optical shutter of claim 1, wherein the difference in absorption between said first and second states at said wavelength is greater than 0.5 in optical density.

11. The optical shutter of claim 1, wherein the difference in absorption between said first and second states at said wavelength is greater than 1.5 in optical density.

12. The optical shutter of claim 1, wherein the difference in absorption between said first and second states at said wavelength is greater than 3.0 in optical density.

13. The optical shutter of claim 12, wherein the thickness of said photon-absorbing layer is 2 to 100 microns.

14. The optical shutter of claim 12, wherein the thickness of said photon-absorbing layer is 4 to 25 microns.

15. The optical shutter of claim 12, wherein the thickness of said photon-absorbing layer is less than 8 microns.

16. The optical shutter of claim 1, wherein said wavelength is a wavelength from 400 to 1000 nm.

17. The optical shutter of claim 1, wherein s aid wavelength is a wavelength from 1000 to 1400 nm.

18. The optical shutter of claim 1, wherein said wavelength is a wavelength from 1400 to 1600 nm.

19. The optical shutter of claim 1, wherein said wavelength is a wavelength from 1520 to 1580 nm.

20. The optical shutter of claim 1, wherein said wavelength is a wavelength from 1500 to 1700 nm.

21. The optical shutter of claim 1, wherein said absorption of said photons images said shutter from said first state to said second state.

22. The optical shutter of claim 1, wherein said absorption of said photons images said shutter from said second state to said first state.

23. The optical shutter of claim 1, wherein said reaction product forms in less than 1 nanosecond after said absorption of said photons by said free radical compound.

24. The optical shutter of claim 1, wherein reaction product forms in less than 0.1 nanoseconds after said absorption of said photons by said free radical compound.

25. The optical shutter of claim 1, wherein reaction forms in less than 0.01 nanoseconds after said absorption of said photons by said free radical compound.

26. The optical shutter of claim 1, wherein said reaction product forms in less than 0.001 nanoseconds after absorption of photons by said free radical compound.

27. The optical shutter of claim 1, wherein said reaction product is an oxidation product of said free radical compound.

28. The optical shutter of claim 1, wherein said reaction product is an one-electron oxidation product of said free radical compound.

29. The optical shutter of claim 1, wherein said reaction product is a two-electron oxidation product of said free radical compound.

30. The optical shutter of claim 1, wherein said reaction product is a reduction product of said free radical compound.

31. The optical shutter of claim 1, wherein said reaction product is an one-electron reduction product of said free radical compound.

32. The optical shutter of claim 1, wherein said reaction product is a two-electron reduction product of said free radical compound.

33. The optical shutter of claim 1, wherein said reverse reaction is induced by heat.

34. The optical shutter of claim 1, wherein said reverse reaction is induced by radiation selected from the group consisting of ultraviolet radiation, visible radiation, and infrared radiation.

35. The optical shutter of claim 34, wherein the wavelength of said radiation inducing said reverse reaction is different from the wavelength of said photons absorbed to form said reaction product.

36. The optical shutter of claim 1, wherein said reverse reaction is induced by the combination of the presence of oxygen and of radiation selected from the group consisting of ultraviolet radiation, visible radiation, and infrared radiation.

37. The optical shutter of claim 1, wherein said reverse reaction occurs at less than 50° C. in the absence of radiation.

38. The optical shutter of claim 1, wherein said reverse reaction occurs in less than 1 second.

39. The optical shutter of claim 1, wherein said reverse reaction occurs in less than 10 milliseconds.

40. The optical shutter of claim 1, wherein said reverse reaction occurs in less than 1 millisecond.

41. The optical shutter of claim 1, wherein said reverse reaction occurs in less than 0.1 milliseconds.

42. The optical shutter of claim 1, wherein said reverse reaction occurs in less than 0.01 nanoseconds.

43. The optical shutter of claim 1, wherein the wavelength of said photons is one or more ultraviolet wavelengths.

44. The optical shutter of claim 1, wherein the wavelength of said photons is one or more wavelengths from 400 to 700 nm.

45. The optical shutter of claim 1, wherein the wavelength of said photons is one or more wavelengths from 700 to 2000 nm.

46. The optical shutter of claim 1, wherein said absorption of said photons by said free radical compound is from a free radical ground state of said free radical compound.

47. The optical shutter of claim 1, wherein the source of said photons is a laser.

48. The optical shutter of claim 47, wherein a first modulator is interposed between said laser and said shutter to provide a desired length of imaging time and a desired imagewise area for the imaging of said shutter by said photons.

49. The optical shutter of claim 48, wherein said reverse reaction is induced by radiation selected from the group consisting of ultraviolet radiation, visible radiation, and infrared radiation, and a second modulator is interposed between the source of said radiation and said shutter to provide a desired length of imaging time and a desired imagewise area for said reverse reaction of said shutter by said radiation.

50. The optical shutter of claim 49, wherein the wavelength of said photons is different from the wavelength of said radiation inducing said reverse reaction.

51. The optical shutter of claim 47, wherein said light-emitting device has a plurality of light-emitting pixels having a circumference and an intermittent light emission to provide a desired length of imaging time and a desired imagewise area for the imaging of said shutter by said photons.

52. The optical shutter of claim 51, wherein said reverse reaction is induced by radiation selected from the group consisting of ultraviolet radiation, visible radiation, and infrared radiation, and a second electroluminescent light-emitting device with a plurality of light-emitting pixels having a circumference and an intermittent light emission provides a desired length of imaging time and a desired imagewise area for said reverse reaction of said shutter by said radiation.

53. The optical shutter of claim 52, wherein the wavelength of said photons is different from the wavelength of said radiation inducing said reverse reaction.

54. The optical shutter of claim 1, wherein the source of said photons is a continuous light source.

55. The optical shutter of claim 54, wherein a first modulator is interposed between said continuous light source and said shutter to provide a desired length of imaging time and a desired imagewise area for the imaging of said shutter by said photons.

56. The optical shutter of claim 55, wherein said reverse reaction is induced by radiation selected from the group consisting of ultraviolet radiation, visible radiation, and infrared radiation, and a second modulator is interposed between the source of said radiation and said shutter to provide a desired length of imaging time and a desired imagewise area for said reverse reaction of said shutter by said radiation.

57. The optical shutter of claim 56, wherein the wavelength of said photons is different from the wavelength of said radiation inducing said reverse reaction.

58. The optical shutter of claim 1, wherein the source of said photons is an electroluminescent light-emitting device.

59. The optical shutter of claim 1, wherein said photon-absorbing layer comprises an organic polymer.

60. The optical shutter of claim 1, wherein said photon-absorbing layer comprises an inorganic glass.

61. The optical shutter of claim 1, wherein said photon-absorbing layer comprises one or more inorganic xerogel layers.

62. The optical shutter of claim 1, wherein said optical shutter comprises a metallized layer on at least one side of said photon-absorbing layer.

63. The optical shutter of claim 62, wherein said metallized layer comprises aluminum.

64. The optical shutter of claim 1, wherein said shutter further comprises a surface layer having a low reflectivity state at said wavelength, wherein said surface layer is characterized by said absorption of said photons to form a high reflectivity state of said surface layer and by a reverse reaction of said high reflectivity state to regenerate said low reflectivity state; and wherein said shutter is characterized by being reversibly imageable between said low and high reflectivity states.

65. The optical shutter of claim 64, wherein said absorption of said photons images said shutter from said first state and said low reflectivity state to said second state and said high reflectivity state.

66. The optical shutter of claim 1, wherein said shutter is utilized in an optical switch array for a fiber optics communications channel.

67. The optical shutter of claim 1, wherein said shutter is utilized in a protection device for protection of eyes or sensors from a source of radiation.

68. The optical shutter of claim 1, wherein said shutter is utilized in a security protection system based on detecting said change in absorption upon imaging of said shutter in said security protection system by radiation selected from the group consisting of ultraviolet radiation, visible radiation, and infrared radiation.

69. The optical shutter of claim 1, wherein said shutter is utilized in a viewing lens of an eyewear device.

70. An optical switch array comprising one or more input optical channels, one or more output optical signal channels, and one or more input optical signal channels, two or more output optical signal channels, and one or more optical shutters, said one or more shutters imageable by photons and having a first state of a low absorption at a wavelength and a second state of a high absorption at said wavelength, and at least one of said one or more shutters comprising a photon-absorbing layer, wherein said photon-absorbing layer comprises an organic free radical compound and is characterized by absorption of said photons by said free radical compound to form a reaction product having a change in absorption at said wavelength and by a reverse reaction of said reaction product to regenerate said free radical compound; and wherein at least one of said one or more shutters is characterized by being reversibly imageable between said first and second states, and wherein said switch array is characterized by being capable of switching the optical signal of said wavelength entering said switch array from a first input optical signal channel to exiting said switch array in a second output optical signal channel.

71. The optical switch array of claim 70, wherein said absorption of said photons images at least one of said one or more shutters from said first state to said second state, said optical signal entering said switch array from said first channel is split by an optical signal splitting device into two or more optical signals in two or more channels, and said at least one of said one or more shutters is interposed in an optical path for one of said two or more optical signals between said splitting device and said second channel for the output of said one of said two or more optical signals.

72. The optical switch array of claim 71, wherein at least one of said one or more shutters is interposed in an optical path between said splitting device and one or more reflective surfaces, which one or more reflective surfaces are part of the optical path to said second channel.

73. The optical switch array of claim 70, wherein at least one of said one or more shutters further comprise a surface layer having a low reflectivity state at said wavelength, wherein said at least one of said one or more shutters is characterized by absorption of said photons to form a surface layer having a high reflectivity state and by a reverse reaction of said high reflectivity state to regenerate said low reflectivity state of said surface layer; and wherein said at least one of said one or more shutters is characterized by being reversibly imageable between said low and high reflectivity states.

74. The optical switch array of claim 73, wherein said absorption of said photons images said at least one of said one or more shutters from said first state to said second state.

75. The optical switch array of claim 70, wherein said switch array further comprises an optical wavelength conversion layer to convert said optical signal at said wavelength to a second different wavelength.

76. The optical switch array of claim 75, wherein said optical wavelength conversion layer comprises an organic free radical compound.

77. An optical buffer for storing an optical signal for a desired time, said buffer comprising at least two optical shutters positioned at first distances and first angles from each other, wherein said at least two shutters are imageable by photons and have a first state of a low absorption at a wavelength and a second state of a high absorption at said wavelength, said shutters comprising a photon-absorbing layer, wherein said photon-absorbing layer comprises an organic free radical compound and is characterized by absorption of said photons by said free radical compound to form a reaction product having a change in absorption at said wavelength and by a reverse reaction of said reaction product to regenerate said free radical compound; and wherein said at least two shutters are characterized by being reversibly imageable between said first and second states; and said at least two shutters further comprise a surface layer having a low reflectivity state at said wavelength, wherein said at least two shutters are characterized by absorption of said photons to form a surface layer having a high reflectivity state and by a reverse reaction of said high reflectivity state to regenerate said low reflectivity state, wherein said at least two shutters are characterized by being reversibly imageable between said low and high reflectivity states;

wherein at least two of said at least two shutters are interposed between an input channel carrying said optical signal and an output channel for said optical signal.

78. The optical buffer of claim 77, wherein said absorption of said photons images said shutter from said first state to said second state.

79. The optical buffer of claim 78, wherein said buffer further comprises two or more reflective surfaces positioned at second distances and second angles from said at least two shutters to return said optical signal to at least one of said at least two shutters.

80. The optical buffer of claim 79, wherein said first distances, first angles, second distances, and second angles are selected to return said optical signal in said desired time to one of said at least two shutters interposed between said input channel and said output channel.

81. The optical buffer of claim 80, wherein said first distances, first angles, second distances, and second angles are adjustable to match changes in said desired time for storing said optical signal.

82. An optical router comprising;
(a) an input channel comprising a plurality of optical signals having one or more wavelengths;
(b) an optical switch array having a plurality of optical shutters;
(c) an optical serial-to-parallel shutter interposed between said input channel and said switch array, wherein said serial-to-parallel shutter is imageable by photons and has a first state of a low absorption at a wavelength and a second state of a high absorption at said wavelength, said serial-to-parallel shutter comprising a photon-absorbing layer, wherein said photon-absorbing layer comprises an organic free radical compound and is characterized by absorption of said photons by said free radical compound to form a reaction product having a change in absorption at said wavelength and by a reverse reaction of said reaction product to regenerate said free radical compound; and wherein said serial-to-parallel shutter is characterized by being reversibly imageable between said first and second states and said absorption of said photons images said serialto-parallel shutter from said second state to said first state; and
(d) a light source;
wherein said light source provides photons onto said surface of said shutter, whereby said serial-to-parallel shutter is imaged from said second state to said first state and reversibly back to said second state at different locations on said surface over a period of time and said plurality of optical signals of said input channel passes through said serial-to-parallel shutter at a plurality of locations, wherein said locations are positioned to direct the transmission of the optical signal passing through one of said locations to one of said optical shutters of said switch array.

83. The optical router of claim 82, wherein said plurality of optical signals of said input channel comprise an optical header of an optical packet.

84. The optical router of claim 82, wherein said router further comprises an optical signal amplifier on one or both sides of said serial-to-parallel shutter.

85. The optical router of claim 82, wherein said router further comprises an optical frequency doubling device on one side of said serial-to-parallel shutter to convert said one or more wavelengths of said plurality of optical signals of said input channel to one-half the wavelengths of said one or more wavelengths.

86. The optical router of claim 82, wherein said router further comprises one or more optical splitting devices on one side of said serial-to-parallel shutter to split said optical signals and one or more optical frequency doubling devices on one side of said serial-to-parallel shutter such that said optical shutters of said switch array are imaged by two different optical signals.

87. The optical router of claim 86, wherein the wavelengths of said two different optical signals are different, the wavelength of one of said two different optical signals is utilized to image a first reaction of said optical shutters of said switch array, and the wavelength of the second of said two different optical signals is utilized to image a reverse reaction of said first reaction.

88. The optical gain filter of claim 87, wherein said gain filter comprises one or more interference filter layers to remove wavelengths that are different from said wavelength.

89. A tunable optical gain filter comprising an optical shutter, wherein said shutter is imageable by photons and has a first state of a low absorption at a wavelength and a second state of a high absorption at said wavelength, said shutter comprising a photon-absorbing layer, wherein said photon-absorbing layer comprises an organic free radical compound and is characterized by absorption of said photons by said free radical compound to form a reaction product having a change in absorption at said wavelength and by a reverse reaction of said reaction product to regenerate said free radical compound; and wherein said shutter is characterized by being reversibly imageable between said first and second states and said gain filter provides a desired per cent transmission of an optical signal at said wavelength.

* * * * *